United States Patent
Patel et al.

(10) Patent No.: US 7,227,158 B1
(45) Date of Patent: Jun. 5, 2007

(54) STICK-ON SELF-INDICATING INSTANT RADIATION DOSIMETER

(75) Inventors: Pareshkumar Patel, Middlesex, NJ (US); Jessica Patel, Middlesex, NJ (US); Gordhanbhai N. Patel, Middlesex, NJ (US)

(73) Assignee: JP Labs, Inc., Middlesex, NJ (US)

( * ) Notice: Subject to any disclaimer, the term of this patent is extended or adjusted under 35 U.S.C. 154(b) by 0 days.

(21) Appl. No.: 11/269,147

(22) Filed: Nov. 8, 2005

Related U.S. Application Data

(63) Continuation-in-part of application No. 10/545,796, filed as application No. PCT/US2004/005860 on Feb. 26, 2004.

(60) Provisional application No. 60/626,287, filed on Nov. 9, 2004, provisional application No. 60/450,267, filed on Feb. 27, 2003.

(51) Int. Cl.
*G01T 1/06* (2006.01)
(52) U.S. Cl. .................................................. 250/484.5
(58) Field of Classification Search ............ 250/484.5, 250/472.1, 474.1
See application file for complete search history.

(56) References Cited

U.S. PATENT DOCUMENTS

| | | | | |
|---|---|---|---|---|
| 3,202,821 A | * | 8/1965 | Kocher | 250/482.1 |
| 3,393,318 A | * | 7/1968 | Brady et al. | 250/482.1 |
| 4,001,587 A | * | 1/1977 | Panchenkov et al. | 250/474.1 |
| 4,130,760 A | * | 12/1978 | Fanselow et al. | 250/474.1 |
| 4,507,226 A | | 3/1985 | Noakes et al. | 252/600 |
| 4,698,296 A | | 10/1987 | Lewis | 430/333 |
| 4,705,741 A | | 11/1987 | Lewis et al. | 430/333 |

(Continued)

FOREIGN PATENT DOCUMENTS

EP           0 117 390           5/1984

(Continued)

OTHER PUBLICATIONS

International Preliminary Report on Patentability, International Application No. PCT/US2004/005860, Dec. 15, 2005, Datta, S.

(Continued)

*Primary Examiner*—David Porta
*Assistant Examiner*—Mark R. Gaworecki
(74) *Attorney, Agent, or Firm*—Joseph T. Guy; Nexsen Pruet, LLC

(57) ABSTRACT

A dual dosimeter system with (1) a stick-on, self-indicating, instant radiation dosimeter applied onto (2) a conventional radiation dosimeter and/or detector for monitoring high energy radiations, such as X-ray, electrons and neutrons. Radiation dosimeters, such as X-ray film and TLD (Thermoluminescence Dosimeters), are highly sensitive but are not instant. Radiation detectors, such Geiger counter, ionization chamber and silicon diode type electronic detectors, are highly sensitive and instant but have several other drawbacks, e.g., they are fragile, bulky, dose rate dependent or require electrical power. In the event of a dirty bomb, nuclear detonation or a radiological accident, one needs to know the harmful high dose (e.g., higher than 0.1 rad) instantly so proper precautions can be taken and medical treatment, if required, can be given to the victim. If a self-indicating instant dosimeter is applied to the conventional dosimeters and detectors, one would know high dose instantly.

35 Claims, 6 Drawing Sheets

U.S. PATENT DOCUMENTS

| | | | | |
|---|---|---|---|---|
| 4,705,742 | A | 11/1987 | Lewis | 430/333 |
| 4,734,355 | A | 3/1988 | Lewis et al. | 430/270.1 |
| 4,784,934 | A | 11/1988 | Lewis et al. | 430/270.1 |
| 4,788,126 | A * | 11/1988 | Feldman et al. | 430/138 |
| 4,918,317 | A | 4/1990 | Hess et al. | 250/474.1 |
| 4,952,244 | A | 8/1990 | Lewis et al. | 106/150.2 |
| 4,954,428 | A | 9/1990 | Lewis et al. | 430/495.1 |
| 4,970,137 | A | 11/1990 | Lewis et al. | 430/296 |
| 5,002,852 | A | 3/1991 | Lewis et al. | 430/270.1 |
| 5,051,597 | A * | 9/1991 | Lewis et al. | 250/474.1 |
| 5,084,623 | A | 1/1992 | Lewis et al. | 250/474.1 |
| 5,137,964 | A | 8/1992 | Lewis et al. | 524/550 |
| 5,139,927 | A | 8/1992 | Liu et al. | 430/346 |
| 5,139,928 | A | 8/1992 | Lewis | 430/346 |
| 5,147,787 | A | 9/1992 | Lewis et al. | 435/41 |
| 5,149,617 | A | 9/1992 | Liu | 430/346 |
| 5,215,869 | A | 6/1993 | Liu | 430/333 |
| 5,215,870 | A | 6/1993 | Liu et al. | 430/333 |
| 5,232,820 | A | 8/1993 | Lewis et al. | 430/338 |
| 5,359,200 | A | 10/1994 | Donahue et al. | 250/475.2 |
| 5,420,000 | A * | 5/1995 | Patel et al. | 430/332 |
| 5,637,876 | A | 6/1997 | Donahue et al. | 250/474.1 |
| 5,732,112 | A | 3/1998 | Langberg | 378/162 |
| 5,767,520 | A | 6/1998 | Donahue et al. | 250/474.1 |
| 5,777,341 | A | 7/1998 | Seiwatz et al. | 250/474.1 |
| 6,015,621 | A * | 1/2000 | Lischewski et al. | 428/411.1 |
| 6,177,578 | B1 | 1/2001 | Lewis et al. | 554/121 |
| 6,198,108 | B1 | 3/2001 | Schweitzer et al. | 250/472.1 |
| 6,268,602 | B1 | 7/2001 | Seiwatz et al. | 250/252.1 |
| 6,285,031 | B1 | 9/2001 | Listl et al. | 250/474.1 |
| 6,504,161 | B1 * | 1/2003 | Jackson et al. | 250/474.1 |

FOREIGN PATENT DOCUMENTS

EP     0 325 863     11/1990

OTHER PUBLICATIONS

Low Cost Self Indicationa Dosimeter (LCSID), Gordon K. Reil and Charles Woodruff, International Conference On Low-Level Radiation Injury and Medical Countermeasures. Nov. 8, 10, 1999 Bethesda MD.

Low Cost Self Indicationg Dosimeter (LOCSID), Gordon Riel, American Chemical Society, 1st Technology Transfer Fair, Aug. 21-22, 2000, Washington, DC.

Low Cost Self Indicating Casualty Dosimeter, G.K. Riel, R.D. Rogalski, 36th Annual Midyear Meeting "Radiation Safety Aspects of Homeland Security and Emergency Response", Jan. 26, 2003-1/29/03.

* cited by examiner

US 7,227,158 B1

STICK-ON SELF-INDICATING INSTANT RADIATION DOSIMETER

CROSS-REFERENCE TO RELATED APPLICATIONS

This application claims priority to U.S. Provisional Patent Appl. No. 60/626,287 filed Nov. 9, 2004 which is now abandoned. This application is a continuation-in-part of pending U.S. patent application Ser. No. 10/545,796 filed Sep. 6, 2005 which was filed as PCT/US2004/005860 on Feb. 26, 2004 which, in turn, claims priority to U.S. Provisional Appl. No. 60/450,267 filed Feb. 27, 2003.

STATEMENT OF FEDERAL FUNDING

This invention was made in part with government support under contract W91CRB-04-C-0001 awarded by the US Department of Defense and Technical Support Working Group (TSWG) with funding also provided by the Department of Homeland Security, Department of State and Department of Justice through TSWG.

BACKGROUND

This invention relates to radiation sensitive devices for instantly monitoring a high dose of high-energy radiations, such as electrons, X-rays, protons, alpha particles and neutrons using color-changing materials. More particularly, the present invention is related to a radiation dosimeter which provides instant exposure results and which can be easily adhered to a second radiation detector and dosimeter.

We are exposed to a wide variety of toxic chemicals and biological agents—through our air, water and food—that are hazardous to our health and can potentially induce cancer. At low levels of exposure, these agents either cause little harm to us or the harm is within the acceptable risks. Hence, they are not monitored. However, when the exposure level is expected to be high, e.g., at work places, toxic chemicals and biological agents are monitored.

There are selective detectors/monitors for monitoring exposure to some individual hazardous chemicals and biological agents. As we are exposed to many hazardous chemicals and biological agents, it is not possible to monitor all of them individually or jointly. However, it is possible to monitor radiation selectively. Typically, we monitor exposure to radiation at levels way below the acceptable risks. There is a need for a dosimeter which instantly monitors hazardous dose of ionizing radiation so preventive measures can be taken. Color changing/developing instant radiation dosimeters for monitoring low dose, e.g., 0.1 to 1,000 rads, have been reported recently in commonly assigned U.S. Pat. No. 5,420,000; PCT publication number WO2004/017095 and PCT Application No. PCT/US2004005860 each of which is incorporated herein by reference thereto.

If a person is exposed to radiation, especially a high dose (e.g., 50 rads), there are predictable changes in the body that can be measured. The number of blood cells and the frequency of chromosome aberrations in the blood cells are examples of biomarkers used to indicate radiation exposure. Rapidly dividing cells are more susceptible to radiation damage. Examples of radiosensitive cells are blood forming cells (bone marrow), intestinal lining, hair follicles and fetuses. Hence, these develop cancer more readily. The risk for radiation exposure has been very widely studied.

It is well established that a high dose of ionizing radiation can cause cancer and other problems. At 0 to 25 rads there is no easily detectable clinical effect in humans. However, at about 15 rads there could be temporary sterility particularly in the case of testicular radiation. At about 25 to 100 rads a slight short-term reduction in blood cells is observed but disabling sickness is not common. At 100 to 200 rads nausea and fatigue is observed, vomiting occurs at doses greater than 125 rads and longer-term a reduction in the number of some types of blood cells is observed. At 200 to 300 rads nausea and vomiting typically occur on the first day of exposure. There may be up to a two-week latent period followed by appetite loss, general malaise, sore throat, pallor, diarrhea, and moderate emaciation. Recovery usually occurs in about three months unless complicated by infection or injury. At 300 to 600 rads nausea, vomiting, and diarrhea occur in the first few hours. There may be up to a one-week latent period followed by a loss of appetite, fever, and general malaise in the second week followed by bleeding, inflammation of mouth and throat, diarrhea, and emaciation. Some deaths occur in two to six weeks. Eventual death of 50% of victims is expected if exposure is above 450 rems. Recovery time is about six months. Over 600 rads nausea, vomiting, and diarrhea occurs in the first few hours followed by rapid emaciation and death in the $2^{nd}$ week. Eventual death of nearly 100% of victims is expected.

There is no doubt that radiation can cause cancer. The question is what level of radiation it takes to cause cancer. Some believe that this low level is about 20 rads. Below this dose it is not possible to detect adverse health effects. The Health Physics Society has issued a position statement indicating that there are no observable health effects below 10 rems but that health risks, if they exist below 10 rems, are too small to be observed. (Note: 1 rem is almost equivalent to 1 rad for tissue equivalent materials). No one knows whether there is any risk or not. All we can say now is that no one has detected any statistically significant effect at doses below about 100 mSv (10 rems). Some epidemiological studies suggest an increased risk of cancer in the 15-20 rads dose range. However, the data suggest that risks in the 15-20 rem dose range are very small and difficult to measure. Above 10 rems there appears to be a significant risk of thyroid cancer due to radioiodine exposure in children 15 years of age and younger. The general consensus of opinion for the radiation induction of cancer is a 10% increase in cancer rate/100 rem when the dose is given over a short time with a decrease to 5% when the dose is protracted over an extended time period. This raises an interesting question; what dose range is more important to monitor, 10 mrem-25 rems, 1-1,000 rems, or 10 mrem-1,000 rems?

A large number of radiation detectors, monitors and dosimeters are used for detecting and monitoring radiation. The most popular being ionization chambers, proportional counters, Geiger-Mueller counters, scintillation detectors, semiconductor diode detectors, and dosimeters such as TLD, X-ray film and track etch. Track etch type dosimeters are usually used for monitoring high LET (linear energy transfer) particles, such as alpha particles.

Ionizing radiations, such as X-ray and neutrons, need to be monitored because they have high penetration power and can cause cancer. TLDs (Thermoluminescence dosimeters) and X-ray film dosimeters are widely used for monitoring personal exposure to X-ray radiation. TLD and X-ray film can monitor radiation over a very wide dose range, e.g., 10 mrem –1,000 rems. However, they are not instant and self-reading. They need to be sent to a laboratory for determination of the dose, which may take several days. Electroscope ionization chamber dosimeters, often called quartz or carbon fiber dosimeters, are instant and self-reading but they are the most fragile dosimeters. There are small electronic dosimeters but they are expensive, need batteries and are not resistant to severe conditions, such as very high or low temperatures and water (e.g., laundry cycle). Radiation counters, such as proportional and Geiger-Mueller counters, are not dosimeters. In an event of nuclear detonation, these counters will be overwhelmed and may not monitor total dose exposure.

Tens of millions of radiation dosimeters, such as TLD and X-ray film, are used for monitoring low dose every year. The monitoring period for these dosimeters is typically one to three months. If a person is exposed to high dose, e.g., between 1 and 25 rads, it would take days to months before it is known. Additionally, what we need to monitor are two major exposures (1) high dose instantly and (2) legally allowed dose, e.g., 5 rads/year for nuclear/radiation workers or 25 rads for a lifetime. It is required that we monitor harmful high dose instantly and total dose per year and/or lifetime.

There is also a need for an area dosimeter for areas around radioactive materials, radiation sources, nuclear power plants, nuclear submarine and shipment of radioactive material to monitor radiation dose instantly. A sticker type self-indicating instant radiation dosimeter would be very convenient to use as an area dosimeter.

Hence, there is an ongoing and critical need for a dosimeter, either individually or attached to other dosimeters and detectors, especially when the threat of radiological terrorism is high, which is (1) instant, (2) simple and self-indicating, (3) lightweight so it may be carried on a person at all times or applied to other dosimeters and detectors, (4) inexpensive and disposable, (5) practically non-destructible, (6) can withstand severe ambient and environmental conditions, such as laundry cycle, (7) tamperproof or tamper evident, (8) does not need any external power, such as a battery, (9) integrates the dose for at least one year, (10) tissue equivalent so that no dose correction is required, (11) retains the dose value and the results/dose can be archived, (12) monitors wide dose range (0.1-1,000 rads), (13) monitors all kinds of harmful radiations, such as X-ray, neutrons and high energy electrons over a very wide temperature range (e.g., −20° C. to 60° C.) and (14) independent of energy and dose rate. The dosimeters described in U.S. patent application Ser. No. 10/545,796 filed Sep. 6, 2005 and that described herein meet these requirements.

SUMMARY

It is an object of the present invention to provide a radiation monitoring and detection device which is instant; simple; self-indicating; lightweight so it may be carried on a person at all times or applied to other dosimeters and detectors; inexpensive; disposable; practically non-destructible; can withstand severe ambient and environmental conditions, such as laundry cycle; tamperproof or tamper evident; does not require external power, such as a battery; integrates the dose for at least one year; is tissue equivalent so that no dose correction is required; retains the dose value and the results/dose can be archived; monitors wide dose range (0.1-1,000 rads); monitors all kinds of harmful radiations, such as X-ray, neutrons and high energy electrons over a very wide temperature range (e.g., −20° C. to 60° C.); and is independent of energy and dose rate.

It is another object of the present invention to provide a dosimeter which can be used in combination with additional radiation detection devices and dosimeters. This embodiment provides the user a rapid indication of excessive radiation and provides a method for measuring high dose instantly.

A particular advantage of the present invention is the simplicity and wide use without the necessity of training or subsequent operations to obtain the image.

These and other advantages, as will be realized, are provided in a radiation monitoring device with a support; a self-developing, self-indicating, instant radiation sensitive material coated on the support wherein a radiation dose of 0.01 to 1,000 rads of ionizing radiation can be monitored visually; and a bonding layer, preferably an adhesive, on the support.

Yet another embodiment is provided in a radiation detector with a support sheet and a cover sheet. A self-developing, self-indicating, instant radiation sensitive material is between the support sheet and cover sheet. The material changes optical density in relation to received dose. A dose indicator is integral to the detector or dosimeter wherein the dose indicator has densities corresponding to the optical density of the material. A bonding layer, preferably an adhesive, is on an exterior of said detector.

DETAILED DESCRIPTION

Figure 1:
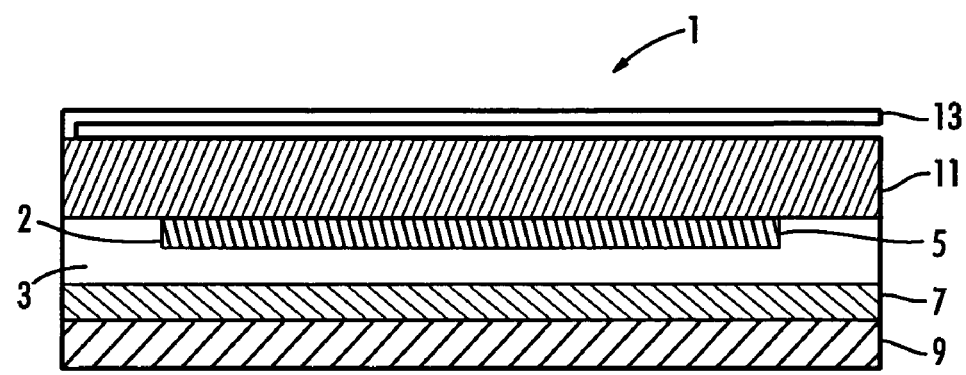
FIG. 1 is a schematic cross-sectional representation of an embodiment of the present invention.
Figure 1A:
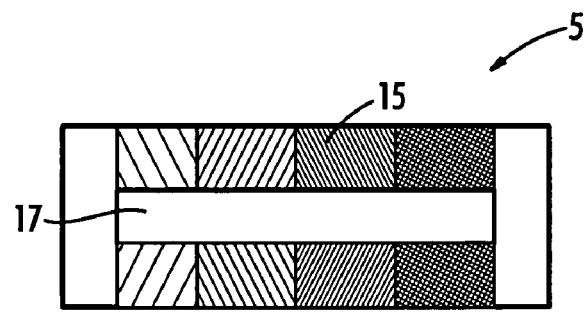
FIG. 1a is a schematic representation of a top view of a radiation monitor with a color chart integral thereto.

The present invention is directed to a stick-on self-indicating instant radiation dosimeter. The invention will be described with particular emphasis on the preferred embodiments and will be described with reference to the figures forming an integral part of the specification. In the figures similar elements will be numbered accordingly.

SIRAD (Self-indicating, Instant, Radiation Alert Dosimeter) is a user-friendly, low-cost, wearable, and disposable radiation dosimeter for monitoring high doses (e.g., 0.1-1, 000 rads) of ionizing radiations (G. Riel, P. Winters, P. Patel and G. Patel, 14th International Conference on Solid State Dosimetry, Jun. 27-Jul. 1, 2004 and PCT/US2004005860). SIRAD is a self-indicating and instant radiation dosimeter. It is always active and ready to use. It does not need a battery. The dosimeter badge is composed of a credit card sized card with a cavity for the radiation sensitive strip and a color reference chart printed on each side of the strip. SIRAD could also be in the form of a thin sticker or tape.

When exposed to radiation e.g., from a "dirty bomb", nuclear detonation or a radiation source, the sensing strip of SIRAD develops color, e.g., blue or red color instantly. The color intensifies as the dose increases, thereby providing the wearer and medical personnel instantaneous information on cumulative radiation exposure of the victim. The color intensity of the sensing strip increases with increasing dose. Dose can be estimated with accuracy better than (1) 20% with color reference chart and (2) 10% using a calibration plot of optical density versus dose.

Materials used in the sensing strip of SIRAD are a unique class of compounds called diacetylenes (R—C≡C—C≡C—R, where R is a substituent group). Diacetylenes are colorless solid monomers. They usually form red or blue-colored polymers/plastics, $[=(R)C—C=C—C(R)=]_n$, when irradiated with high energy radiations, such as X-ray, gamma ray, electrons, and neutrons. As exposure to radiation increases, the color of the sensing strip composed of diacetylenes intensifies proportional to the dose. Using a proper diacetylene and thickness of the coating, one can monitor dose lower than 1 rad, e.g., 0.1 rad or lower.

The sensing strip is sensitive to all forms of radiation with energy greater than that of UV light, and that can also penetrate the protective plastic films that cover the sensing strip. It responds to neutrons, X-ray (energy higher than 10 KeV) and high energy electrons/beta particles. Color development of the sensing strip is essentially independent of dose rate. SIRAD is tissue equivalent and hence no dose correction is required. Particles, such as low energy electrons, protons, alphas, mesons, pions and heavy ions, will be absorbed by the protective films and will not reach the sensing strip.

There is no report on a dual dosimeter system, one of them being a conventional dosimeter and/or detector and applied onto it a self-indicating instant radiation alert dosimeter (SIRAD) for monitoring high energy radiations, such as X-ray, electrons and neutrons. The conventional radiation dosimeters, such as X-ray film and TLD (Thermo Luminescence Dosimeters) are highly sensitive but are not instant. Radiation detectors, such as Geiger counter, ionization chamber (quartz or carbon fiber) and silicon type electronic detectors are also highly sensitive but have several drawbacks, such as they require power, are fragile, dose rate dependant or are overwhelmed by high instant dose. In an event of a dirty bomb or nuclear detonation, one needs to know high dose (e.g., higher than 0.1 rad) instantly so proper precautions and medical treatment can be given to the victim. If an instant dosimeter, such as SIRAD, is applied to the conventional dosimeters and detectors, one would know high dose instantly.

There are countless devices such as labels which can be stuck onto an object. Color developing high dose (kilorads to megarads) indicators/dosimeters are also available commercially for monitoring sterilization with ionizing radiation. However, there are no reports of stick-on type dosimeters for monitoring dose below a thousand rads, especially one being self-indicating and instant. We have developed a stick-on type self-indicating radiation dosimeter for instantly monitoring dose below one thousand rads.

Figure 7:
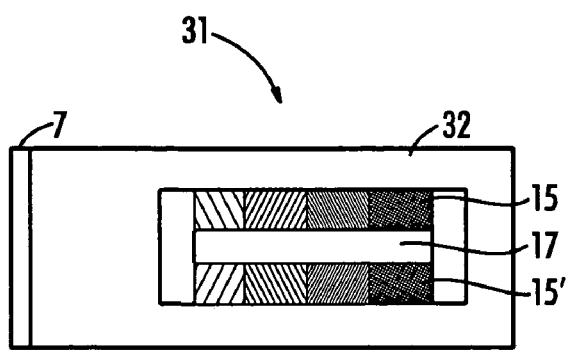
FIG. 7 is a schematic top view of another form of an embodiment with a bonding layer, sensing strip and color reference chart on the same side.
Figure 11:
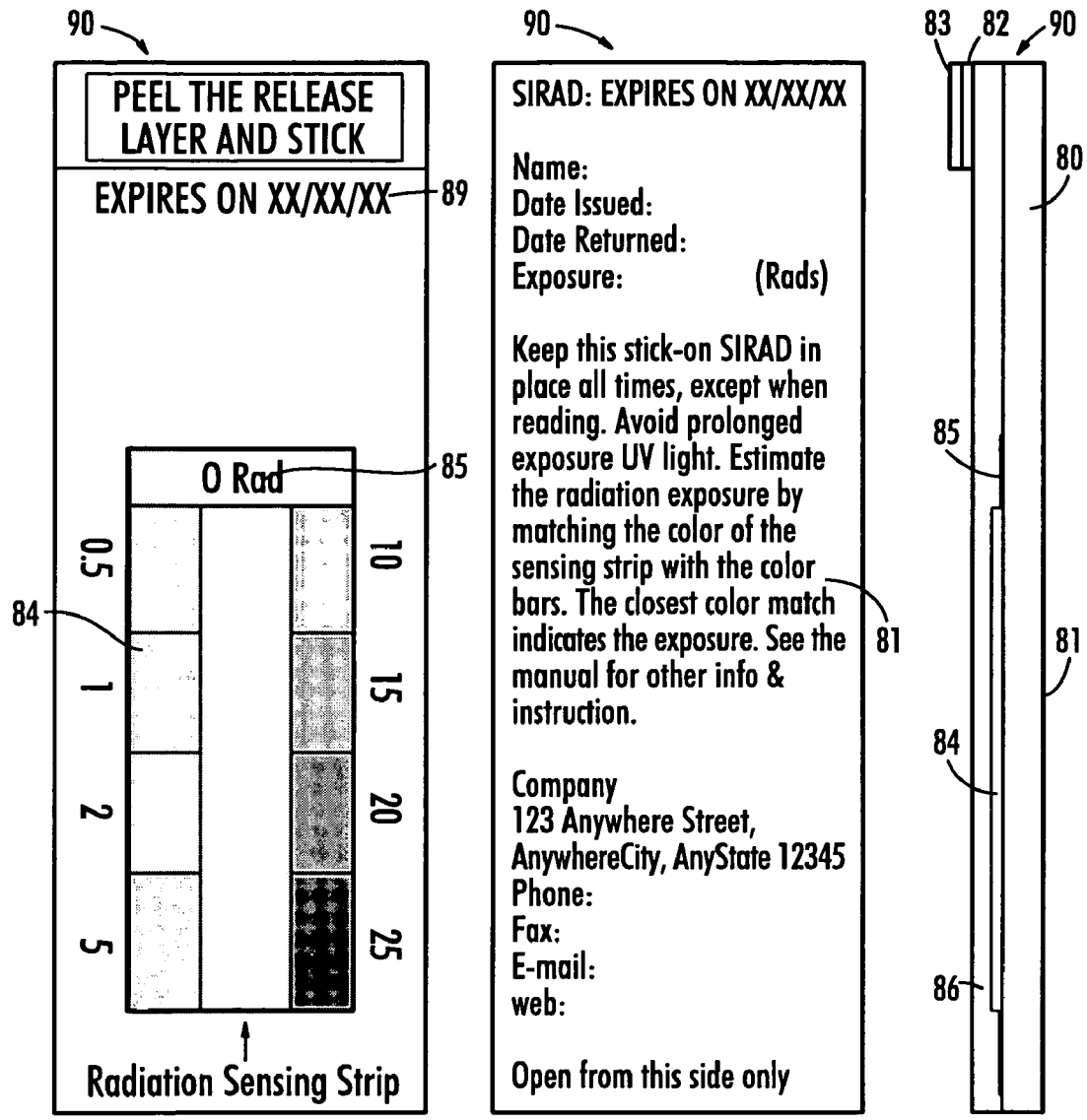
FIG. 11 contains back, top and cross sectional views of an embodiment of the present invention.

A simpler device for monitoring radiation would be in the form of a sticker having a radiation sensitive coating which develops color or which changes color instantly and particularly when the color intensifies with dose. Particularly preferred is a color reference chart for estimating the dose. Exemplary embodiments of such a device are shown in FIGS. 1, 7 and 11 which will be described in more detail infra. The bonding layer, which is preferably an adhesive, and more preferably a pressure sensitive adhesive (PSA), can be applied on the back, on the front or on an alternate face so that it can be applied onto an object. Alternatively, the embodiment can be mounted on the interior of the object. When the bonding layer is on the back, the dosimeter can be viewed more easily. However, it could be exposed to undesired ultraviolet radiation if not protected with a black or opaque protective cover. If a black or opaque protective cover is used, it needs to be lifted to view the dosimeter. More preferably dosimeter can be face down as shown in FIG. 7. To view the dosimeter, one needs to lift the dosimeter itself.

Commercially available radiation dosimeters and detectors have many drawbacks as mentioned herein, for example, either it takes days to know the dose or it needs power. Instead of using SIRAD or another radiation monitoring system alone, a better alternative is to use both SIRAD and another radiation monitoring system together. SIRAD would monitor high dose (e.g., 0.1 to 1,000 rads) with reasonable accuracy while the conventional dosimeter will monitor the lower dose with a higher accuracy. SIRAD, in the form of a lightweight tape or sticker, can be applied on the top or back of conventional dosimeters and detectors or inside of their holders. It can also be applied on any part of the body, clothing, or any other object including equipment. As described in commonly assigned PCT applications WO2004017095 and PCT/US2004005860, SIRAD has the most of the desired properties to monitor an accidental high dose (higher than 0.1 rad) instantly and/or for monitoring annual and lifetime dose. It is also very useful as a co-dosimeter.

An embodiment of the present invention is illustrated in FIG. 1. In FIG. 1, the SIRAD, generally represented at 1, comprises a support, 3. Attached to the support, preferably in a recess, 2, is a radiation sensor, 5, with a color reference chart integral thereto. In a preferred embodiment the radiation sensor, 5, is covered with an radiation blocking layer, 11, such as a UV absorbing film. The radiation blocking layer prohibits radiation from reaching the radiation sensing layer which is not intended to be monitored. An optional, but preferred, cover layer, 13, prohibits the device from being scratched and can provide additional radiation absorption. In a particularly preferred embodiment the cover layer, 13, is a black or opaque layer. A bonding layer, 7, allows the device to be attached to a surface. Particularly preferred is a pressure sensitive adhesive. A release layer, 9, prohibits the bonding layer from sticking to a surface prematurely such as during manufacture, storage or shipping. Just prior to use the release layer is removed thereby exposing the bonding, or adhesive, layer.

Figure 2:
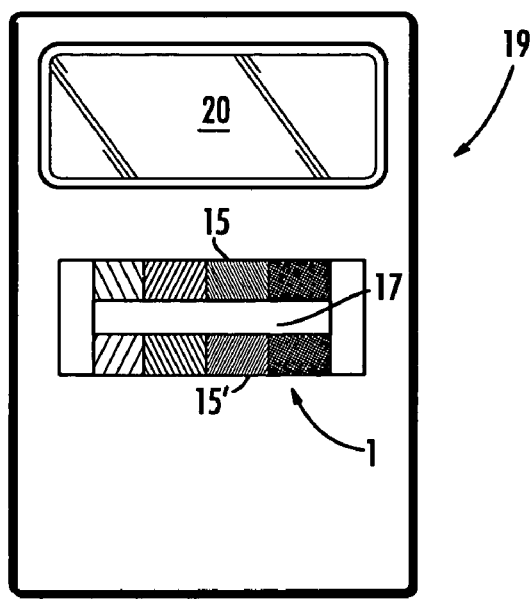
FIG. 2 is a schematic presentation of Geiger/electronic type detector with an embodiment of the present invention.

The radiation sensor, 5, of FIG. 1 is described, and illustrated, in more detail in FIG. 2. The radiation sensor layer comprises the sensing layer, 17, which indicates radiation dosage. A reference chart, 15, is provided which allows a visual comparison of the optical density of the active layer with the reference chart to determine density. It would be readily realized that a description of the dosage corresponding to each level of radiation would be desirable.

Figure 3:
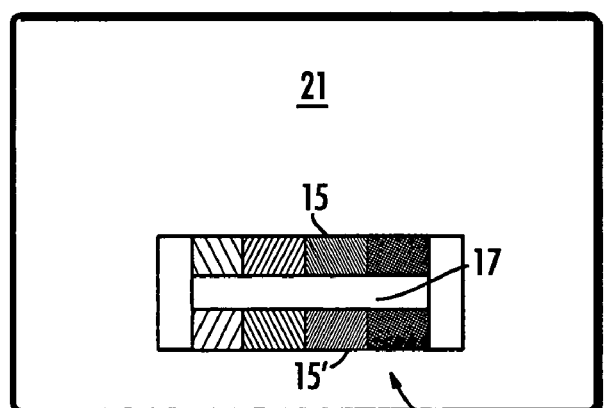
FIG. 3 is a schematic presentation of TLD/film type dosimeter with an embodiment of the present invention.
Figure 4:
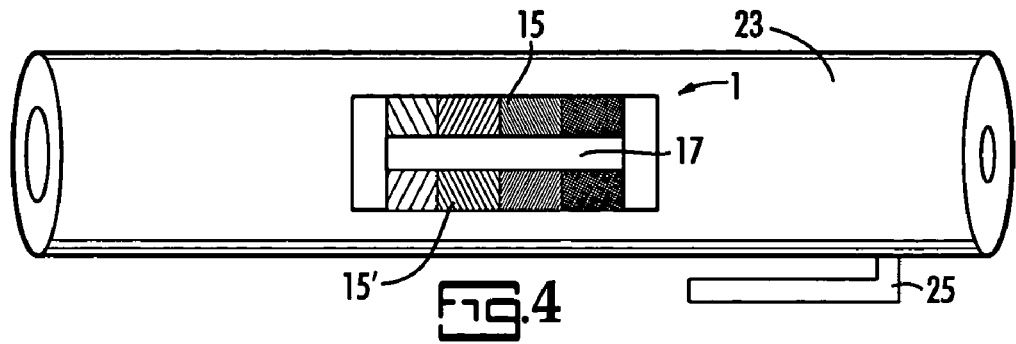
FIG. 4 is a schematic presentation of quartz fiber type dosimeter with an embodiment of the present invention affixed thereto.

An embodiment of the invention is illustrated in FIG. 2. In FIG. 2, an electronic detector, 19, with a display, 20, comprises a SIRAD, 1, unit attached thereto. The reference chart, 15, and sensing layer, 17, are readily visible as would be preferred. The electronic detector is not particularly limiting but a preferred electronic detector is a Geiger counter. In a similar manner to the embodiment of FIG. 2 a SIRAD, 1, is illustrated attached to a film or TLD type dosimeter, 21, in FIG. 3; and to a quartz fiber ionization chamber, 23, with a clip, 25, in FIG. 4.

Another embodiment is illustrated in FIG. 7. In FIG. 7 a upside-down mount SIRAD, 31, comprises a color reference chart, 15 and 15', with an sensing layer, 17, thereby. The layers are on an opaque substrate, 32. A bonding layer, 7, is on a side layer thereby allowing for a upside-down mounting if so desired.

Figure 8:
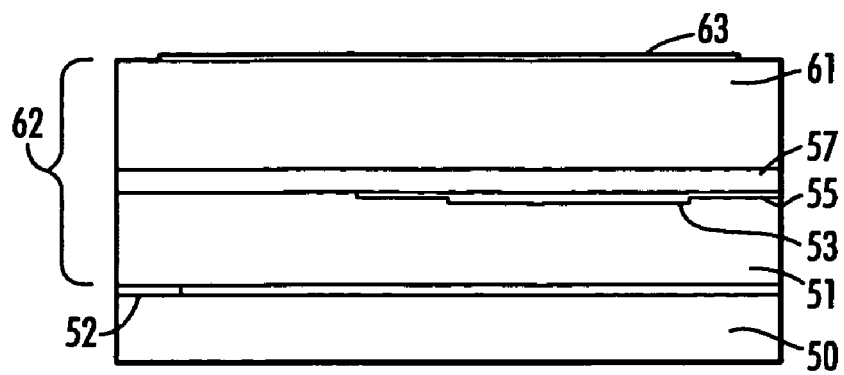
FIG. 8 is a schematic cross-sectional view of another embodiment utilizing the embodiment of FIG. 7 on a surface.

Another embodiment is illustrated in FIG. 8. In FIG. 8, the layers forming the SIRAD, 62, are attached to an object, 50, by a bonding layer, 52. It is preferred that the bonding layer is an adhesive. The connector may be as large as the footprint of the SIRAD or it may be a partial layer as illustrated. A support, 51, such as a UV absorbing layer, comprises a sensing layer, 53, and a reference chart, 55. An optional coating, 57, such as a white coating may be desired is an optional protective coat, 61, optionally comprising colorant or particles to make the layer black, metallized, or absorbing. Instructions, 63, may be provided on the surface.

Figure 9:
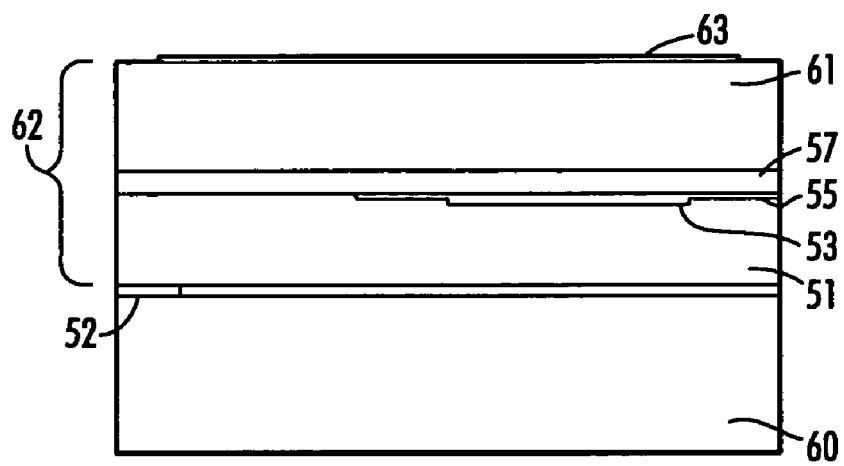
FIG. 9 is a cross sectional view of an embodiment of the present invention applied on credit card sized TLD badges.
Figure 10:
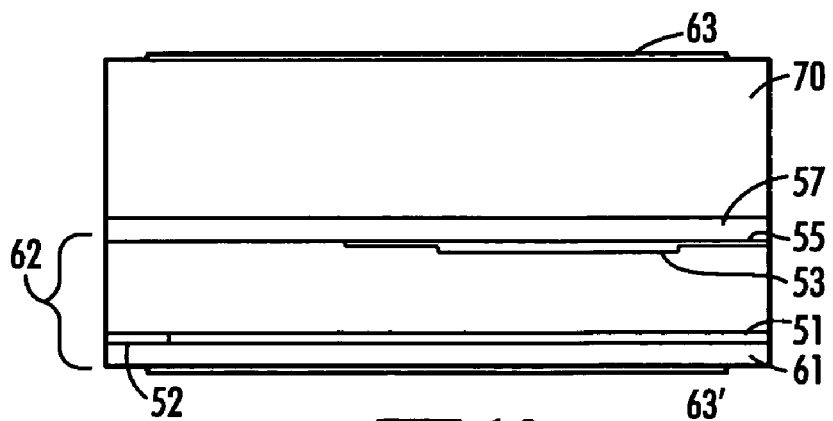
FIG. 10 is a schematic cross-sectional view of an embodiment of the present invention with TLD on the same card.

Similarly, in FIG. 9, the SIRAD, 62, comprising the components is attached to an object, 60, representing a credit card sized TLD badge. A similar embodiment is illustrated in FIG. 10 wherein an embodiment of the present invention with a TLD applied on a SIRAD card and instructions, 63 and 63' are provided on both sides of the device.

A particularly preferred embodiment is illustrated in back view, front view and cross-sectional view in FIG. 11. In FIG. 11, the device, generally represented at 90, comprises a support, 80, which is preferably an opaque polyethylene terephthalate with a thickness chosen for the application. About 100 microns thickness is suitable for most purposes. The support has writing, 81, on the bottom which may include instructions, contact information, etc. The sensing strip, 84, is preferably sandwiched between the support, 80, and a cover layer, 86. The cover layer, 86, protects the device. A particularly preferred cover layer is a polyethylene terephthalate with UV absorbers incorporated therein. It is preferable, but not mandatory, for the cover layer to be thinner than the support with about 50 microns being ideal for demonstrating the invention. A printed placard, 89, may be sandwiched between the support and cover and may include a color reference chart, 85. A bonding layer, 82, such as an adhesive, preferably a pressure sensitive adhesive, and optional release layer, 83, allow the device to be attached to a surface.

SIRAD preferably comprises a thin substrate, on which the sensing strip is printed, coated or attached, with a color reference chart and dose printed around the strip on the top a bonding layer such as an adhesive (e.g., pressure sensitive adhesive, PSA) and release liner. A color reference chart is preferred but it not required. It could also have a black and/or highly opaque protective cover to protect the strip from sunlight. It may optionally have false positive indicators to detect any false positives and/or to indicate expiration of shelf life.

Though an adhesive is preferred as the bonding layer, it also can be attached by other fastening devices such as Velcro, springs, threaded elements, or combinations thereof may be used as an adhesive. Chemical adhesives are preferred however mechanical adhesives are contemplated.

The size and shape of SIRAD application would depend upon the size and shape of the object, i.e., the radiation dosimeter or detector, SIRAD would be applied on. Stick-on SIRAD can be in form an adhesive tape or bandage. The size of SIRAD could range from a square millimeter to several square meters. Most preferably the size is about 1-10 $cm^2$ since this is large enough to be readily readable yet not so large as to be an obstruction. It could be in the form of a circle, square, rectangle strip or any other shapes, e.g., simply in form picture (e.g., radiation symbol) or words (e.g., radiation hazard).

SIRAD can be applied anywhere on any object, including a radiation dosimeter or detector where it can be easily read. It can be applied in the front, back, side or inside an object. Small size Stick-on SIRAD can be applied on a ring dosimeter and one can cover the whole radiation source with large Stick-on SIRAD. It can be applied anywhere on a shipping container to monitor any shipment of radioactive materials. Essentially there is no limit to the application of Stick-on SIRAD. The object for Stick-on SIRAD could also be living human beings, animals, plants, human wear/clothing, radiation dosimeters and detectors, and radiation sources. Stick-on SIRAD in the form of an adhesive tape or bandage could be applied on any object. The position of a sensing strip depends on the location of radiation dose to be monitored. The sensing strip could be up facing the object or the radiation source.

Stick-on SIRAD can also be an integral part of another dosimeter or object. The dosimeter can be printed directly on the object. For example, it can be permanently attached or printed on credit card size TLD or electronic dosimeter. In the case of a TLD or electronic dosimeter fails to record dose, e.g., due to damage, defect or power failure, SIRAD will monitor dose as it does not need power and is essentially non-destructible. SIRAD attached to a credit card sized TLD or electronic dosimeter would determine the need for returning a TLD badge for accurate analysis. Radiation dosimeters, such as X-ray film and TLD (Thermoluminescence Dosimeters), are highly sensitive but are not instant. Radiation detectors, such as Geiger counters, ionization chambers and silicon diode type electronic detectors, are highly sensitive and instant but have several other drawbacks, e.g., they require electrical power, they are fragile, they are bulky or they are dose rate dependant. In the event of a dirty bomb, nuclear detonation, or a radiological accident, one needs to know harmful high dose (e.g., higher than 0.1 rad) instantly so proper precautions can be taken and medical treatment, if required, can be given to the victim. If a self-indicating instant dosimeter is applied to conventional dosimeters and detectors, one would know high dose instantly.

SIRAD also offers the advantage of archiving the results by making the sensing strip inactive to radiation, e.g., by annealing it at a higher temperature and rapidly cooling to room temperature.

A particularly preferred embodiment includes the process of (1) applying a Stick-on SIRAD on any object, (2) exposing it to radiation, (3) estimating the high dose immediately and confirming the same high dose by other techniques such TLD, film or electronic and/or archiving the results.

A preferred class of radiation sensitive materials that can be used for making the shaped-articles are diacetylenes having general formula, R'—C≡C—C≡C—R", where R' and R" are the same or different substituent groups. Though this class of diacetylenes is preferred, other diacetylenes having the following general formulas can also be used: higher acetylenes: R'—(C≡C)$_n$—R", where n=3-5; split di and higher acetylenes: R'—(C≡C)$_m$—Z—(C≡C)$_o$—R", where Z is any diradical, such as —(CH$_2$)$_n$— and —C$_6$H$_4$—, and m and o is 2 or higher; and polymeric di and higher acetylenes: [—A—(C≡C)$_n$—B—], where A and B can be the same or different diradical, such as —(CH$_2$)$_b$—, —OCONH—(CH$_2$)$_b$—NHCOO—, and —OCO(CH$_2$)$_b$ OCO—. where R' and R" can be the same or different groups.

The preferred diacetylenes include those where R' and R" are selected from: (CH$_2$)$_b$—H; (CH$_2$)$_b$OH; (CH$_2$)$_b$—OCONH—R1; (CH$_2$)$_b$—O—CO—R1; (CH$_2$)$_b$—O—R1; (CH$_2$)$_b$—COOH; (CH$_2$)$_b$—COOM; (CH$_2$)$_b$—NH$_2$; (CH$_2$)$_b$—CONHR1; (CH$_2$)$_b$—CO—O—R1; where b=1-10, preferably 1-4, and R1 is an aliphatic or aromatic radical, e.g. C$_4$-C$_6$ alkyl or phenyl or substituted phenyl, and M is a cation, such as Na$^+$ or (R1)$_3$N$^+$.

The preferred diacetylenes are the derivatives of 2,4-hexadiyne, 2,4-hexadiyn-1,6-diol, 3,5-octadiyn-1,8-diol, 4,6-decadiyn-1,10-diol, 5,7-dodecadiyn-1,12-diol and diacetylenic fatty acids, such as tricosa-10,12-diynoic acid (TC), pentacosa-10,12-diynoic acid (PC), their esters, organic and inorganic salts and cocrystallized mixtures thereof. The most preferred derivatives of the diacetylenes, e.g. 2,4-hexadiyn-1,6-diol, are the urethane and ester derivatives.

Preferred urethane derivatives are alkyl, aryl, benzyl, methoxy phenyl, alkyl acetoacetate, fluoro phenyl, alkyl phenyl, halo-phenyl, cyclohexyl, toyl and ethoxy phenyl of 2,4-hexadiyn-1,6-diol, 3,5-octadiyn-1,8-diol, 4,6-decadiyn-1,10-diol, 5,7-dodecadiyn-1,12-diol. The prefer urethane derivatives are methyl, ethyl, propyl and butyl derivatives of 2,4-hexadiyn-1,6-diol, 3,5-octadiyn-1,8-diol, 4,6-decadiyn-1,10-diol, 5,7-dodecadiyn-1,12-diol.

The following are some of the preferred derivatives of 2,4-hexadiyn-1,6-diol: urethane (—OCONH—) derivatives, R'CH$_2$—C≡C—C≡C—CH$_2$R', including: hexyl urethane: 166, R'=OCONH(CH$_2$)$_5$ CH$_3$; pentyl urethane: 155, R'=OCONH(CH$_2$)$_4$ CH$_3$; butyl urethane: 144, R'=OCONH (CH$_2$)$_3$ CH$_3$; ethyl urethane: 122, R'=OCONHCH$_2$CH$_3$; methyl urethane: 111, R'=OCONHCH$_3$; ester (—OCO—) derivatives, R'''CH$_2$—C≡C—C≡C—CH$_2$R''', including: butyl ester: 144E, R'''=OCO(CH$_2$)$_3$CH$_3$; ethyl ester: 122E, R'''=OCOCH$_2$CH$_3$; methyl ester: 111E, R'''=OCOCH$_3$; symmetrical diacetylenes including: 156: R'—C≡C—C≡C—R", where R'=CH$_2$OCONH(CH$_2$)$_5$CH$_3$ and R"=CH$_2$OCONH(CH$_2$)$_4$CH$_3$; cocrystallized mixtures including: containing 80 weight percent or above of 166; 85:15 mixture of 166 and 156; 90:10 mixture of 166 and 156 and 4:1 mixture of tricosadiynoic acid and pentacosadiynoic acid (TP41).

The further preferred diacetylenes are derivatives of 3,5-octadiyn-1,8-urethane, 4,6-decadiyn-1,10-urethane and 5,7-dodecadiyn-1,12-urethane, e.g., hexyl urethane: R'=OCONH(CH$_2$)$_5$ CH$_3$; pentyl urethane: R'=OCONH (CH$_2$)$_4$ CH$_3$; butyl urethane: R'=OCONH(CH$_2$)$_3$ CH$_3$; propyl urethane: R'=OCONH(CH$_2$)$_2$ CH$_3$; ethyl urethane: R'=OCONHCH$_2$CH$_3$; methyl urethane: R'=OCONHCH$_3$.

The most preferred diacetylenes are the urethane derivatives such methyl, ethyl, propyl and butyl urethane derivatives of 4,6-decadiyn-1,10-diol, e.g., diacetylene 344 [R'—C≡C—C≡C—R' where R'=OCONH(CH$_2$)$_3$CH$_3$.

The urethane derivatives can be prepared by reacting diacetylene-diol, e.g., 2,4-hexadiyn-1,6-diol with an appropriate isocyanates (e.g. n-hexylisocyanate) in a solvent, such as tetrahydrofuran, using catalysts, such as di-t-butyltin bis(2-ethylhexanoate) and triethylamine as indicated below:

Catalysts

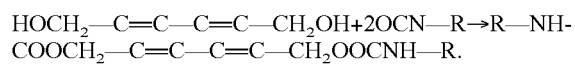

Ester derivatives can be prepared by reacting e.g., 2,4-hexadiyn-1,6-diol with appropriate acid chlorides in a solvent, such as dichloromethane, using a base, such as pyridine as the catalyst; i.e., Pyridine

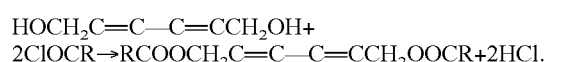

Asymmetrical diacetylenes can be prepared by the Cadiot-Chodkiewicz type reaction methods.

Though individual diacetylenes can be used, it is desirable to alter the reactivity of diacetylenes by cocrystallization. Cocrystallization can be achieved by dissolving two or more diacetylenes, preferably conjugated, prior to molding. For example, when TC and PC are cocrystallized, the resulting cocrystallized diacetylene mixture, such as TP41 (4:1 mixture of TC:PC) has a lower melting point and significantly higher radiation reactivity. The reactivity can also be varied by partial neutralization of diacetylenes having —COOH and —NH$_2$ functionalities by adding a base, such as an amine, NaOH, Ca(OH)$_2$, Mg(OH)$_2$ or an acid, such as a carboxylic acid, respectively.

Other preferred diacetylenes are amides of fatty chain acid, such as TC and PC. The preferred amides are: TCAP=CH$_3$(CH$_2$)$_9$—C≡C—C≡C—(CH$_2$)$_8$—CONH—(CH$_2$)$_3$CH$_3$; PCAE=CH$_3$(CH$_2$)$_{11}$—C≡C—C≡C—(CH$_2$)$_8$—CONH—CH$_2$CH$_3$; PCAP=CH$_3$(CH$_2$)$_{11}$—C≡C—C≡C—(CH$_2$)$_8$—CONH—(CH$_2$)$_3$CH$_3$; PCACH=CH$_3$(CH$_2$)$_{11}$—C≡C—C≡C—(CH$_2$)$_8$—CONH—C$_6$H$_5$; and TCACH=CH$_3$(CH$_2$)$_9$—C≡C—C≡C—(CH$_2$)$_8$—CONH—C$_6$H$_5$.

In order to maximize radiation reactivity, 166 can be co-crystallized with other diacetylenes, e.g. 155, 157, 154 and 156, which are described above. Though certain diacetylenes, such as 155, increase the reactivity of 166, the partially polymerized cocrystallized diacetylenes provide a red color upon melting. However, 156 increases the radiation reactivity of 166 and provides a blue color upon melting the partially polymerized diacetylene mixture. 166 can be cocrystallized with different amounts of 156. Preferred is where the amount is 5-40 weight percent of 156 to 166, most preferred are 90:10 and 85:15 respective weight ratios of 166:156. As used herein "9010" and "8515" refer to these specific cocrystallized mixtures.

Other asymmetrical derivatives, including different functionalities, e.g., ester as one substituent and urethane as the other, can also be prepared. A procedure for synthesis of a 90:10 mixture of 166 and 16PA is given in U.S. Pat. No. 5,420,000. Using the general procedures given in U.S. Pat. No. 5,420,000, it is possible to prepare a variety of other asymmetrical derivatives and their mixtures for cocrystallization.

Polymers having diacetylene functionality [e.g., {—R'—(C≡C)$_n$—R"—}$_x$, where R' and R" can be the same or different diradical, such as —(CH$_2$)$_n$—, —OCONH—(CH$_2$)$_n$—NHCOO— and —OCO(CH$_2$)$_n$OCO— in their backbones are also preferred because of the fact that they are polymeric and do not require a binder.

The preferred diacetylenes are those which have a low (e.g., below about 150° C.) melting point and crystallize rapidly when cooled at a lower temperature, e.g. room temperature.

Another class of preferred diacetylenic compounds is those having an incorporated metal atom and they can be used as built-in converters. Diacetylenes having functionalities, such as amines, ethers, urethanes and the like can form complexes with inorganic compounds. It is possible to synthesize diacetylenes having an internal converter, which is covalently bonded, such as boron and mercury, lithium, copper, cadmium, and other metal ions. For example, the —COOH functionality of TC, PC and TP41 can be neutralized with lithium ion and synthesis of R—C≡C—C≡C—Hg—C≡C—C≡C—R is reported (M. Steinbach and G. Wegner, Makromol. Chem., 178, 1671 (1977)). The metal atom, such as mercury atom thereby incorporated into the diacetylene can emit short wavelength irradiation upon irradiation with photons and electrons.

The following terminologies are used for defining the reactivity (polymerizability) of a diacetylene. The polymerizable form of a diacetylene(s) is referred to as "active". If a diacetylene is polymerizable with radiation having energy higher than 4 eV, wavelength shorter than 300 nm, then it is referred to as "radiation active". If it is polymerizable upon thermal annealing then it is referred to as "thermally active". A form of diacetylene, which displays little or no polymerization, is referred to as "inactive". If it displays little polymerization with radiation (having energy higher than 4 eV) then it is referred to as "radiation inactive" and if it is significantly nonpolymerizable upon thermal annealing, then it is referred to as "thermally inactive". Diacetylenes having reactivity/polymerizability characteristics in between these definitions are referred to as "moderately active". The most preferred form of diacetylene is one, which is highly radiation reactive and displays little or no thermal reactivity. However, diacetylenes, which are radiation active also usually, have some thermal reactivity. Hence, the preferred form of diacetylene is one, which is highly to moderately radiation active with little or no thermal reactivity. Thermal reactivity can be decreased and radiation reactivity can be increased by cocrystallization and molecular complexation. As an alternative, the shaped-articles can be stored at a lower temperature to slow down the thermal reactivity.

Polymerization, and hence the color development, of diacetylene is known to be independent of dose rate and energy of radiation. At a lower dose the color development is linear with dose. Diacetylenes are usually nontoxic. Many diacetylenes show little or no post radiation effect.

The term "converter(s)" is used for any material, substance or mixture, which can be complexed or doped with other substances, which when irradiated with high energy radiations, both ionizing and nonionizing, produces relatively lower energy radiation, either of the same or different type, via any process including scattering, attenuation, fluorescence, phosphorescence, and conversion. Inorganic and organometallic compounds are preferred as converters because they have the ability to transfer/convert high-energy radiation into lower energy radiation via many processes, such as scattering, absorbance, fluorescence, and phosphorescence. The selection of a converter depends upon the type of radiation to be monitored and its energy. For example, lead and barium salts are good converters for monitoring X-ray radiation and boron, lithium salts are good converters for measuring thermal neutrons.

When high-energy radiation strikes a metal, secondary electrons and other radiations of longer wavelengths are emitted. The emission of these secondary radiations become greater in materials with a high atomic number. Barium salts are especially preferred because they are nontoxic. Elements having high atomic number (Z), such as lead, are also preferred. Other converters include alloys, salts, and free metals of zinc, tin, silver, tungsten, molybdenum, platinum, gold, copper, iodine, and bromine.

The resulting image can be amplified by incorporating converter materials into the radiation sensitive mixture, under coat, topcoat, and preferably into all these. The converters will absorb high energy X-ray, radiation, electrons, and neutrons and convert the absorbed radiation into secondary low energy ionizing radiation. These secondary low energy ionizing radiations and nuclear particles, such as alpha particles emitted by the converter can initiate a reaction in the radiation sensitive materials. The secondary radiation, irrespective of its source can be absorbed by the converter materials and emit tertiary ionizing radiation which in turn can also initiate a reaction in the radiation sensitive materials. When the secondary radiations are electrons, use of electroluminescence materials as converters can amplify the image.

The image of a thin shaped-article e.g., film, can be further amplified by placing it into intimate contact with one or two screens made from converter materials. The screens in their simplest form can be a plain metal foil and/or coated with a radioluminescence, electron luminescence or fluorescence phosphor material, which emits radiation of usually lower energy. The X-ray image can be amplified by using phosphor materials, which emit energy higher than 4 eV as screen materials. Phosphor materials, which emit long wavelength UV light, can be made to emit higher energy radiation by appropriate dopants, quantity of dopants and doping processes. An appropriate voltage can also be applied to the screens to produce secondary electrons, which in turn can also initiate a reaction in the radiation sensitive materials, thereby also amplifying the image.

Any material, which is an organic, inorganic and/or organometallic compound, which emits radiation of wavelength lower than 300 μm, (energy higher than 4 eV) including those emitted by fluorescence and phosphorescence, upon irradiation with high energy radiation can be used as a converter for the undercoat, radiation sensitive coat, top coat and the screens. In order to maximize the sensitivity of the film, the selection of a proper converter is required. A converter which has a strong ability to absorb high-energy radiation and emit high intensity radiation of significantly lower energy, but higher than 4 eV, is preferred.

Substances commonly known as cathode/electroluminescence materials, i.e., are materials which when contacted with electrons emit lower energy radiation. Electroluminescence phosphors, such as hafnium pyrophosphate and those substituted with zirconium, germanium and silicon, which emit UV light or can be made to emit UV light by doping are preferred phosphors. These materials can also be used as converters if they emit radiation having energy higher than 4 eV, because the secondary electrons can induce cathode luminescence materials to emit UV and X-ray radiation, which in turn can initiate the polymerization of diacetylenes.

A material which emits radiation having a wavelength shorter than 1 nm can be used as a converter. Preferred are those, which emit UV radiation in the range of 300 to 1 nm. UV radiation is rapidly absorbed by the diacetylene functionality and causes their polymerization. Hence, a preferred converter should emit radiation of energy between 300 and 100 nm. Materials commonly known as phosphors include those from the II-VII Periodic Table group phosphors (e.g. ZnS, ZnCdS) and a rare earth phosphor (e.g. $Gd_2O_2S$, $Y_2O_2S$) and three elemental oxide phosphors (e.g. $CaWO_3$, $ZnSiO_4$). Converters, such as barium lead sulfate, naphthalene-sodium iodide doped with Tl, $ZrP_2O_7$ (zirconium phosphate), which can emit UV light, can be used. Properly doped phosphors, such as barium fluorochloride and lanthanum oxybromide, terbium activated rare earth oxysulfide ($X_2O_2S$ where X is gadolinium, lanthanum or yttrium), GdOS:Tb(III); LaOS:Tb(III); LaOBr:Tb(III); LaOBr:Tm (III); $Ba(FCl)_2$:Eu(II); $SrB_4O_7$:Eu (strontium europium borates); $BaSi_2O_5$:Pb (barium silicate); $(CeBa)MgAl_{11}O_{19}$ (cerium, barium-magnesium aluminate); strontium pyrophosphate activated with europium, phosphates of zirconium, germanium, silicon and hafnium; and yttrium tantalates either unactivated or activated, can emit short wavelength UV light. The preferred phosphor is the one, which emits short wavelength UV light (e.g., 300-50 μm).

For monitoring neutrons, compounds having a high neutron cross-section are preferred converters. The neutron cross-section for boron decreases as the energy of neutrons increases. Naturally occurring boron compounds have about 20% boron-10. Amines form a complex with boric acid. Boric acid (BA) is nontoxic and inexpensive. Shaped-articles containing boron and lithium, especially boron, as a converter can be used for monitoring thermal neutrons and boron-neutron capture therapy. Elements having high neutron cross-section and emitting electrons and gamma rays, e.g., gadolinium can also be used as a converter for neutrons.

Although any solid substrate having a smooth surface can be used for coating radiation sensitive shaping formulations and making film, preferred substrates are flexible and transparent plastic film, and natural (cellulose) and synthetic (e.g., spun bonded polyolefins, e.g., Tyvek®) papers. Plastic films, such as polyethylene, polypropylene, polyvinylchloride, polymethylmethacrylate, polyurethanes, nylons, polyesters, polycarbonates, polyvinylacetate, cellophane and esters of cellulose can be used as the transparent substrate. Metal foils, such as aluminum can also be used.

Strong adhesion of the radiation sensitive layer with the substrate film is required. If the coating does not adhere to the base film, it usually flakes off. In order to increase the adhesion of the coating to the substrate, a thin coating, known as a subcoating, undercoat or substratum, which has ability to bond with a substrate, such as polyester base film and the radiation sensitive coating, is applied on the polyester film. The nature/composition of the substratum will depend upon the nature/composition of the binder.

The layer containing the radiation sensitive material may be coated with a barrier material. The purpose of a barrier layer is to minimize diffusion of undesirable chemicals, e.g., diffusion of chemicals from an adhesive layer and those from environment including oxygen, water and water vapor and also minimize the effect of other undesirable radiation, such as UV light. A barrier layer may be a polymeric layer, such as polymers used as binder and listed herein. Barrier layer may contain additives, such as UV absorber. Between all these layers proposed here, one may apply a prime layer to get good bonding between them.

Diacetylenes, such as 166, 344, 4BCMU, PC, TC and esters and amide of TC and PC were dissolved in molten polymers, such as polybutylene, polymethylmethacrylate, polybutylmethacrylate, polybutylmethacrylate/isobutylmethacrylate, polyethylene, poly(ethylene-co-acrylic acid), poly(ethylmethacrylate), polyethylene/vinylacetate, poly (isobutylmethacrylate), polyvinylbutyral, polyvinylbutyral, polyvinylchloride, polyvinylstearate, poly(ethylene-co-acrylic acid), poly(ethylene-co-methacrylic acid), polybutadiene, polyvinylacetate, poly(ethyelene-co-butylacrylate-co-carbon monoxide), poly(o-cresyl glycidyl ether)-formaldehyde, poly(ethylene-co-1-butene), poly (ethylene-co-methylacrylate), polyethylene-co-vinylacetate-co-carbon monoxide), polyhexamethyleneadipate, and polyhexamethylenevinylene. Molten mixtures can be pressed into thin films and plaques and then cooled to room temperature. Depending upon the polymer and diacetylene, opaque, translucent and transparent shaped objects can be obtained. The shelf life of the SIRAD made by this melt processing technique can be increased by adding shelf life extenders listed herein.

A variety of solvents and plasticizer can also be added in formulations for proper crystallization of diacetylenes or dissolution of radiation sensitive dyes and to adjust the temperature of clarity and plasticization of the binders. Use of solvent and plasticizer will depend upon several factors, such as nature and concentration of radiation sensitive materials, binders, and additives. High boiling solvents, such as butoxy-2-ethylstearate, butyrolactone, diethyl fumarate, dimethyl maleate, dimethylcarbonate, dioctyl phthalate, ethylene glycol dimethyl ether, ethyl salicylate, polyethylene glycol dimethylether, propylene carbonate, triacetin, benzyl ether, dodecyl-1,2-methylpyrrolidone, ethoxyethylacetate, ethylene glycol diacetate, ethyltrichloroacetate, methylpyrrolidone, methyl sulfoxide, polyethylene glycols of different molecular weight, dimethylformamide, cyclohexane, p-dioxane, tetrahydrofuran and p-xylene. Preferred solvents are high boiling solvents, plasticizers and liquid oligomers can be employed. The most preferred solvents are dioctylphthalate, ethylene glycol diacetate and ethyl salicylate.

The use of plastisol offers many advantages. For example, they eliminate the solvent which needs to be evaporated. They lower the processing temperature if the element is to be made by melt processes. They also make plastic/binder softer and flexible. They also help in minimizing the effect of temperature of irradiation.

A topcoat of about 0.5-2 microns, also known as a supercoat, is usually applied to make the coating resistant to abrasion. The topcoat can contain many other additives, such as a converter, such as lead iodide and sodium iodide, which is capable of producing radiation of lower energy when irradiated with the high-energy radiation thereby enhancing the image and UV absorbers. Although the polymers in the radiation sensitive coat, sub-coat, and topcoat can be different, the converter material and UV absorbers can be the same or different depending upon the binder used. As the film does not require wet processing, any scratch resistant polymers can also be used as the topcoat. The protective coat can also contain other additives, such as an antistatic compound, scratch resistant and anti-reflective materials. This topcoat can be polyurethanes, polyepoxies, polysiloxanes, and polyacrylics which provide hard protective coat.

The dosimeter should have a shelf life of months to years. It is most preferred that the radiation monitoring device, or the radiation sensitive element, demonstrate an optical density of no more than 0.05 after storage at ambient conditions for one month. The shell life of the SIRAD made from diacetylene, for monitoring X-ray mainly depends on the UV radiation and thermal reactivities. The shelf life of diacetylenes can be extended by adding shelf life extenders, such as heat stabilizers, quenchers (of the exited state), scavengers, antioxidants, inhibitors (of reactive species), oxygen scavenger, preventor (of reactive species), UV stabilizers, UV reflectors, and UV absorbers in the diacetylenic formulations. The compounds, such as heat stabilizers, quenchers (of reactive species), scavengers (e.g., radical and oxygen scavengers), antioxidants, inhibitors (of reactive species), preventor (of reactive species), thermo-oxidative preventors, photo-oxidative preventors, hydroperoxide decomposer, H-donors, metal destabilizers, UV stabilizers, UV absorbers, UV reflectors and alike are collectively or individually termed herein as shelf life extenders. The amount and nature of shelf life extenders required depends upon the nature of the diacetylene and the solvent or polymeric binder used for crystallization of diacetylenes.

The concentration of the shelf life extenders required will depend on many factors such as the nature of the radiation sensitive material, the solvent and non-solvent used to make the coating solution, dispersion or melt mixture and binder used. The shelf life extenders can be used from 0.1 to almost 75 wt % of the total solid. A 5-50 wt % concentration is preferred. The most preferred range is 5-30 weight % of the shelf life extender relative to the total solid.

Polymerization diacetylenes could be due to initiation of polymerization by reactive species, such as radicals, radical ions and carbenes. Often certain impurities can also initiate polymerization of diacetylenes. If formation of the reactive species which initiate polymerization of diacetylenes are stopped from formation or destroyed if formed, the shelf life can be extended. We have found that polymerization inhibitors, such as phenols, polyphenols and substituted phenols, hydroquinone and its alkyl hydroquinone derivatives, e.g., methyl hydroquinone, catachol, pyrrogallol and their derivatives e.g., di-t-butyl catechol, benzoquinone, chloranil, ferric chloride, cupric chloride, sulfur, and radical inhibitors, such as diphenylpycrylhydrazine, galvanoxyl and triphenylverdazyl, aromatic amines, such as diphenylamine can be used for extending the shelf life.

Heat stabilizers such as antioxidants, oxygen scavengers, thermo-oxidative preventors, photo-oxidative preventors, hydroperoxide decomposer, H-donors, reactive species quenchers, metal destabilizers and alike and their mixtures are very effective in extending the shelf life of diacetylenes. Alkyl sulfides, alkyl phosphites, aromatic amines, alkyl phenols, metal dithiophosphates and metal dithiocarbamates, tetramethylpiperidine can be used to extend the shelf life of diacetylenes. Butylated hydroxytoluene (BHT), 2,3-t-butyl-4-hydroxanisole, 2,6-di-tert-butyl-4-ethylphenol, bisphenolics, thiobisphenols, organophosphites and thioesters can be used as antioxidants for the dosimeter.

Aromatic amines, especially secondary aromatic amines and sterically hindered phenols are excellent H-donors and can be used as the shelf life extenders of diacetylenes. Examples of such H-donors include m-xylylenediamine, diphenylamine, 1,3-bis(aminomethyl) cyclohexane, 1,3-bis (3-aminomethylphenyl-methylamino)-2-propanol, 1.3-bis (N,N—N-diglycidylaminomethyl)cyclohexane and N,N,N', N'-tetraglycidyl m-xylenediamine.

Organic compounds of trivalent phosphorus, such as e.g. phosphites or phosphonites, and organic compounds of sulfur, e.g. sulfides, metal salts of dialkyldithiocarbamates and dithiophosphates are widely used hydroperoxide decomposers. Among sulfur based hydroperoxide decomposers, esters of 3,3-thiodipropionic acid play an important role. The principal reaction is the thermolysis of the initially formed sulfoxide to a sulfenic acid. A variety of subsequent oxidation reactions starting from sulfenic acid contribute to further hydroperoxide decomposition and in a later stage of transformations, inorganic sulfur acids and sulfur oxides are formed. All acidic species formed can decompose ROOH in an overstoichiometric manner. These hydroperoxide decomposers can also be used as the shelf life extenders for the dosimeter.

Radical scavengers, such as benzofuranone and its derivative can also be used as shelf life extenders.

In order to minimize the formation of peroxide, it is important that diffusion of oxygen is minimized. Polymeric materials which minimize permeation of oxygen can be used as binders and protective coat or film. Oxygen can also be scavenged by oxygen scavengers, such as amines, phenols, quinones, aldehydes, carbohydrazines, unsaturated organic compounds and reducing agents. The example of oxygen scavengers which are suitable for increasing the shelf life include: aldehydes, hydroxyalkylhydroxylamine, N,N,-bis-(2-hydroxyethyl)hydroxylamine, N,N-bis(2-hydroxypropyl) hydroxylamine, N,N-bis(2-hydroxybutyl)hydroxylamine, 1-aminopyrrolidine, 1-amino-4-methylpiperazine, anthrone, elagic acid, aldehydes, such as acetaldehyde, gltarldehyde and furfural, hydroquinone, 2,3-dimethyl-1,4-hydroquinone, 2-tert-butylhydroquinone, catechol, 4-tert-butyl catechol, pyrogallol, 1,2,4-hydroxybenzene, gallic acid, methyl gallate, ethyl gallate, propyl gallate, 2-aminophenol, 1,4-naphthoquinone, 1,2-naphthoquinone, 1,4-naphthohydroquinone, 1,2-naphthohydroquinone, 2,6-naphthoquinone, naphthopurpurine, 5,8-dihydro-1,4-naphthoquinone, 5,6,7, 8-tetrahydro-1,4-naphthoquinone, 3,4-dihydroxy-1,4-naphthoquinone, 4-amino-1,2-naphthoquinone, 2-amino-1,4-naphthoquinone, cyclohexylamine, 2-amino-2-methyl-1-propanol, monoethanolamine, diethanolamine, morpholine, monoisopropanolamine, diethylethanolamine, diethylpropanolamine, dimethylethanolamine, and dimethylpropylamine, diethylhydroxylamine (DEHA), morpholine, sodium metabisulfite, sodium sulfite, dimethyl sulfoxide, 2,6-di(t-butyl)-4-methylphenol (BHT), 2,2'-methylene-bis (6-t-butyl-p-cresol), triphenylphosphite, tris-(nonylphenyl) phosphite, dilaurylthiodipropionate, vitamin E (alpha-tocopherol), octadecyl 3,5,-di-tert-butyl-4-hydroxyhydrocinnamate, tetrakis[methylene(3,5-di-tert-butyl-4-hydroxyhydrocinnamate)]methane, tannin and quarternary ammonium chloride, such as tetraethylammonium chloride.

Quenchers can absorb the energy from the excited groups thereby retarding their development as destructive free-radicals. HALS (hindered amine light stabilizers), a widely used class of UV stabilizers are thought to act partially as quenchers. Antioxidant action from UV stabilizers, such as HALS are used widely to achieve UV degradation resistance. Unlike UV absorbers, this class of compounds reacts with peroxides and free-radicals formed by exposure of the material to UV light; scavenging them and thereby neutralizing their harmful effects. We have found that HALS are also effective in extending the shelf life.

UV stabilizers or quenchers, such as Poly[4,4-methylenebis(phenyl isocyanate)-alt-1,4-butanediol/poly(ethylene glycol-co-propylene glycol/polycaprolactone], Poly[N,N-bis(2,2,6,6-tetramethyl-4-piperidinyl)-1,6-hexanediamine-co-2,4-dichloro-6-morpholino-1,3,5-tria, 1,5,8,12-Tetrakis [4,6-bis(N-butyl-N-1,2,2,6,6-pentamethyl-4-piperidylamino)-1,3,5-triazin-2-yl]-1,5,8,12-tetraazadode and 5,5-Methylenebis(2-hydroxy-4-methoxybenzophenone) can also be used for the dosimeter.

Ultraviolet radiation is divided into three groups of wavelengths. UVC (less than 290 nm), UVB (290-320 nm), and UVA (320-400 nm). Diacetylenes depending upon substituent group develop color when exposed to all UV lights to a greater or lesser degree. The diacetylenes and the element made from it can be protected either by incorporating UV absorbers and UV stabilizers in the element or by applying a coat having UV absorbing polymers. Aromatic polymers, such as polystyrene, polyethylene terephthalate, aromatic polyurethanes and poly(bis-phenol carbonate) are good UV absorbers. The UV absorbing capability can be further increased and broadened by adding proper UV absorbers, such as benzophenones (hydroxy benzophenones), benzotriazoles (hydroxy benzotriazoles), benzoates, oxanilides and salicylates are widely used as UV absorbers. We have found that the use of UV absorbing polymers, UV absorbers and UV stabilizers are very effective in increasing the shelf life. Micronized (to micron and submicron sizes) titanium, iron and zinc oxides can also be used UV absorbers. We have found that nano-particles, for example, those of zinc oxide, tin oxide and titanium dioxide are very effective UV absorbers.

Examples of UV absorbers include, Benzamide, benzophenone hydrazone, 3,3',4,4' benzophenone tetracarboxylic dianhydride, benzotriazole, 2,2' biphenol, 4,4' biphenol, bisphenol A, 2-(2H-benzotriazole-2-yl-4-methyl phenol), coumarin, ethylhexyl p-methoxycinnamate, 2-ethylhexyl salicylate, oxybenzone, p-aminobenzoic acid its derivatives, diester and/or polyester of a naphthalene dicarboxylic acid, cinnamates (octylmethoxy cinnamate and cinoxate), salicylates (methyl salicylate), anthranilates, such as menthyl anthranilate, 2-ethylhexyl-2-cyano-3,3-diphenyl acrylate, 2-phenyl benzimidazole-5-sulfonic acid, digalloyl trioleate, 3-(4-methyl benzylidene) camphor, 4-isopropyl dibenzoyl methane, butyl methoxy dibenzoyl methane, 2-ethyl-2-cyano-3,3'-diphenyl acrylate, cupferron, ethylsalicylate, hydroxy methoxy benzophenone, hydroxybenzophenone, hydroxycinnamic acid, sulfosalicylic acid, tetrahydroxy benzophenone, fluorescin, fast blue BB, phenothiazine, 4-nitrophenol, 7-hydroxy-4-methylcoumarin, 2-(2H-Benzotriazol-2-yl)-4-(1,1,3,3-tetramethylbutyl)phenol, 2-(2H-Benzotriazol-2-yl)-4,6-di-tert-pentylphenol, Poly[2-(4-benzoyl-3-hydroxyphenoxy)ethyl acrylate], 2-tert-Butyl-6-(5-chloro-2H-benzotriazol-2-yl)-4-methylphenol, 2-(2H-Benzotriazol-2-yl)-4,6-bis(1-methyl-1-phenylethyl)phenol, 2,2-Methylenebis[6-(2H-benzotriazol-2-yl)-4-(1,1,3,3-tetramethylbutyl)phenol], 2-(2H-Benzotriazol-2-yl)-6-dodecyl-4-methylphenol, 2-Phenyl-5-benzimidazolesulfonic acid, 2-(2'-hydroxy-5-octylphenyl benzotriazole), 3,4diaminobenzophenone, 2,4 dihydroxybenzophenone, 3,5 dihydroxy benzoic acid, 2,2' dihydroxy 4,4' dimethyl benzophenone, 2,2' dihydroxy 4 methoxy benzophenone, 2,3 dihydroxy naphthalene, diphenylamine, di-tert-butyl-4-methyl phenol, 4-hydroxybenzophenone, 2-hydroxy-4-methoxy benzophenone, 2-hydroxy-4n-octyloxybenzophenone, lauryl gallate, phenyl hydroquinone, 4,4'(1,4 phenylene diisopropylidine) bisphenol, 4,4'(1,3 phenylene diisopropylidine) bisphenol, salicylanilide, 2,2',4,4' tetrahydroxy benzophenone, 2,3,4 trihydroxybenzophenone, trimethyl hydroquinone, and 1,1,1 tris(4-hydroxyphenyl)ethane.

UV absorbers and UV stabilizers can be added in the active layer containing diacetylenes and the active layer can be coated with UV absorbers and UV stabilizers. One can use a mixture of UV absorbers and UV stabilizers.

The shelf life of the dosimeter can be extended by incorporating UV reflective materials in the binder, barrier layer and the top layer. The dosimeter can also be protected from UV light by having multiple UV reflective layers. Holographic and dichroic films and polarizers are effective in reducing the effect of UV light. A surface can be made UV reflective by sputter coating certain inorganic materials. A UV reflective layer can be obtained from organosilicon compounds (U.S. Pat. No. 6,486,338) and cholesteric liquid-crystalline polymers (U.S. Pat. Nos. 5,827,449 and 6,159,454). Liquid-crystalline materials having a cholesteric phase with a pitch of less than 400 nm, comprising a) liquid-crystalline organosiloxanes containing dianhydrohexitol derivatives as chiral groups, and b) chiral monomeric additives which induce the same helicality as the respective liquid-crystalline organo-siloxanes can be used. Multilayer polymeric films and other optical bodies as described in U.S. Pat. Nos. 6,498,683 and 6,531,230, can also provide protection from UV light.

Many compounds are fluorescent. They are good UV absorbers. They absorb UV light and emit light of longer wavelength. There are a large number of fluorescence compounds which can be used as UV absorbers to extend the shelf life of the dosimeter; coumarins, rhodamines, acridines, coumestrols, fluoresceins, pyrenes, stillbenes, resorufins, eosins, xanthanes, naphthalimides, and polymethines are the major classes of fluorescence compounds which can be used to protect the dosimeter from UV/sunlight. The following compounds commonly known as fluorescence probes can be used: 2-hydroxybiphenyl, fluram, fluoresceinamine, anthracene, 1,2-bis(2-aminophenoxy)ethane-N,N,N',N'-tetraacetic acid tetrasodium salt, phenanthrene, anthracene-9-carboxylic acid, phthaldialdehyde, phthaldialdehyde, 2',7'-dichlorofluorescin diacetate, 1-ethyl-naphthalene, 9-fluorenylmethyl carbazate, triphenylene, naphthalene, phenanthridine, coumarin, dihydrofluorescein diacetate, p-terphenyl, 3-(4-hydroxyphenyl)propionic acid, 1,2-bis(2-aminophenoxy)ethane-N,N,N',N'-tetraacetic acid, 1-arginine-4-methyl-7-coumarinyl amide hydrochloride, trioxsalen, p-quaterphenyl, 5(6)-carboxyfluorescein diacetate N-succinimidyl ester, fluorescein diacetate, 5(6)-carboxyfluorescein diacetate, 5(6)-carboxy-2',7'-dichloro fluorescein diacetate n-succinimidyl ester, 2-ethylnaphthalene, 2,5-diphenyloxazole, 4-nitrophenyl phosphate disodium salt, 4-nitrophenyl phosphate disodium salt, 4-nitrophenyl phosphate disodium salt, 5-methoxypsoralen, 3,3-dimethyl-2-(4-dimethylaminostyryl)-1-octadecylindolium perchlorate, 4-methylumbelliferyl palmitate, 4-methylumbelliferyl enanthate, 4-methylumbelliferyl oleate, 4-methylumbelliferyl acetate, 4-methylumbelliferyl acetate, 4-methylumbelliferyl butyrate, 4-methylumbelliferyl-n-acetyl-alpha-d-neuraminic acid sodium salt dihydrate, N,N'-bis(salicylidene)ethylenediamine, 4-methylumbelliferyl-beta-d-galactopyranoside, 4-methylumbelliferyl-beta-d-glucuronide trihydrate, 4-methylumbelliferyl-beta-d-glucopyranoside, 4-methylumbelliferyl-n-acetyl-beta-d-glucosaminide dihydrate, 4-methylumbelliferyl-alpha-d-glucopyranoside, 4-methylumbelliferyl-alpha-d-galactopyranoside, 8-nonanoyloxypyrene-1,3,6-trisulfonic acid trisodium salt, 6-(p-toluidino)-2-naphthalene sulfonic acid, 6-(p-toluidino)-2-naphthalene sulfonic acid sodium salt, 4-methylumbelliferyl phosphate, 4-methylumbelliferyl phosphate disodium salt, 2-naphthol, 7-hydroxy-4-methyl-2(1H)-quinolone, quinine hydrochloride dihydrate, calcein blue, N-succinimidyl 7-hydroxy-4-coumarinylacetate, 4-methylumbelliferyl 4-guanidino benzoate hydrochloride monohydrate, 7-ethoxycoumarin, 4-heptadecyl umbelliferone, glutaryl-1-phenylalanine 4-methyl-7-coumarinylamide, 4-(trifluoromethyl)umbelliferyl-beta-d-glucopyranoside, 4-(trifluoromethyl)umbelliferyl-beta-d-galactopyranoside, umbelliferone, 1-alanine-4-methyl-7-coumarinylamide trifluoroacetate, 3,4-dimethylumbelliferone, 1-leucine-4-methyl-7-coumarinyl amide hydrochloride, N-succinimidyl 7-hydroxy-4-methyl-3-coumarinylacetate, firefly luciferin sodium salt, firefly luciferin, trans, trans-1,4-diphenyl-1,3- butadiene, 4-benzylamino-7-nitrobenzofurazan, 4-bromomethyl-7-methoxycoumarin, 1,4-diacetoxy-2,3-dicyanobenzene, 7-methoxy-4-methylcoumarin, 7-ethoxy-4-methylcoumarin, 3-carboxyumbelliferyl-beta-d-galactopyranoside, 1-naphthol, 2-(1-naphthyl)-5-phenyloxazole, 1,5-diaminonaphthalene, 4-methylumbelliferyl-N,N'-diacetyl-beta-d-chitobioside monohydrate, 3-carboxyumbelliferyl-beta-d-galactopyranoside N-succinimidyl ester, 3-(2-benzothiazolyl)umbelliferone, 3-phenylumbelliferyl phosphate hemipyridine salt, 7-ethoxy-4-(trifluoromethyl)coumarin, 2-(4,4,4-trifluoroacetoacetyl)naphthalene, 7-methoxy-4-(trifluoromethyl)coumarin, 4-methylumbelliferyl sulfate potassium salt, dansyl cadaverine, 9,10-bis-N-(2-dimethylaminoethyl)methylamino methylanthracene bis-zinc chloride complex, 11-(5-dimethylamino naphthalene-1-sulfonylamino)undecanoic acid, psoralen, dansylhydrazine, N-(iodoacetaminoethyl)-1-naphthylamine-5-sulfonic acid, 4-chloro-7-nitrobenzofurazan, 4-chloro-7-nitrobenzofurazan, 4-chloro-7-nitrobenzofurazan, dansyl-1-tyrosyl-1-valyl-glycine trifluoroacetate, 3-(dansylamino)phenylboronic acid, bisbenzimide, 3-phenylumbelliferone, 4-methylumbelliferyl-N,N',N''-triacetyl-beta-chitotrioside, bisbenzimide, 7-methoxycoumarin, 1-methylpyrene, 2-4-(iodoacetamido)phenyl-6-methylbenzothiazole, xanthotoxin, 6,7-diethoxy-4-methylcoumarin, 2,3-diaminonaphthalene, 1-pyrenebutyric acid, 4,4'-diisothiocyanato stilbene-2,2'-disulfonic acid disodium salt, 6-(1-pyrenyl)hexanoic acid, 1-pyrenedodecanoic acid, 1-pyrenedecanoic acid, 7-hydroxycoumarin-3-carboxylic acid, pyrene-1-carboxylic acid, 4-dimethylamino-1-naphthyl isothiocyanate, quinine sulfate dihydrate, 6-methoxy-1-(3-sulfopropyl)quinolinium monohydrate, pyrene-1-sulfonic acid sodium salt, pyrene-1-carboxaldehyde, 3-bromomethyl-7-methoxy-1,4-benzoxazin-2-one, quinine anhydrous, 2-amino-5-(6-carboxyindol-2-yl)-phenol-N,N,O-tetraacetic acid potassium salt, 4-(6-methyl-2-benzothiazolyl)phenyl isocyanate, 4-methylumbelliferyl-alpha-d-mannopyranoside, 3-(2-benzoxazolyl)umbelliferyl octanoate, 2-(2-amino-5-methylphenoxy)methyl-6-methoxy-8-aminoquinoline-N,N,N',N'-tetraacetic acid tetrakis (acetoxymethyl ester), cholesteryl pyrene-1-carboxylate, 1,6-diphenyl-1,3,5-hexatriene-4'-propionic acid, 6,7-dimethoxy-4-(trifluoromethyl)coumarin, 3-(2-benzoxazolyl)umbelliferyl acetate, n-hexadecylpyrene-1-sulfonamide, 1,6-diphenyl-1,3,5-hexatriene, 7-amino-4-methyl-3-coumarinylacetic acid, pyrene, phthalocyanine, phthalocyanine, 7-amino-4-methylcoumarin, 4-bromomethyl-6,7-dimethoxycoumarin, dihydroethidium, 1-(ethoxycarbonyl methyl)-6-methoxy quinolinium bromide, 1,6-diphenyl-1,3,5-hexatriene-4'-trimethylammonium tosylate, 5-dimethylamino naphthalene-1-sulfonyl fluoride, 1,8-diamino naphthalene, 8-amino naphthalene-1,3,6-tri sulfonic acid disodium salt, 1,4-bis(5-phenyl-2-oxazolyl)benzene, N-succinimidyl 7-methoxycoumarin-3-carboxylate, 7-hydroxy-n-octadecylcoumarin-3-carboxamide, 4-(4-dimethylamino styryl)-1-octadecylpyridinium perchlorate, 4-chloro-7-sulfobenzofurazan ammonium salt, 3-octadecanoyl umbelliferone, 7-methoxycoumarin-3-carboxylic acid, 7-hydroxy-4-methyl-3-coumarinylacetic acid, 6,7-dihydroxy-4-methylcoumarin, anthracene-9-carbonyl cyanide, hydroxystilbamidin-bis-methansulfonate, N,N-dimethyl-6-propionyl-2-naphthylamine, fura-2, N,N-dimethyl-6-dodecanoyl-2-naphthylamine, 6,8-diacetoxypyrene-1,3-disulfonic acid disodium salt, 2-(4-dimethylaminostyryl)-3-octadecylbenzo thiazolium perchlorate, 7-hydroxy-4-coumarinylacetic acid, 6,7-dihydroxy-4-(trifluoromethyl) coumarin, 8-hexadecanoyl oxypyrene-1,3,6-trisulfonic acid trisodium salt, 8-dodecanoyl oxypyrene-1,3,6-trisulfonic acid trisodium salt, cholesteryl anthracen-9-carboxylate, 5,6-benzocoumarin-3-carbonyl chloride, 3-acetyl umbelliferone, 5-dimethylamino naphthalene-1-sulfonyl chloride, 8-anilino naphthalene-1-sulfonic acid ammonium salt, 4-methyl umbelliferone (beta), 11-(pyrene-1-sulfonyl amino)undecanoic acid, 3,3'-diethylthia carbocyanine iodide, monochlorobimane, trans-4'-hydrazino-2-stilbazole dihydrochloride, 3,6,8-tris(dimethylamino sulfonyl)-1-pyrenyl phosphate pyridine salt, 1-(4-methoxyphenyl)-6-phenyl hexatriene, 9,10-anthracendiyl-bis-(methylen)-dimalonsaure, 12-(anthracene-9-carbonyloxy)stearic acid, 8-oleoyloxypyrene-1,3,6-trisulfonic acid trisodium salt, 8-octanoyloxypyrene-1,3,6-trisulfonic acid trisodium salt, 8-butyryloxypyrene-1,3,6-trisulfon acid trisodium salt, 8-butyryloxy-N,N,N',N',N'',N''-hexa methylpyrene-1,3,6-trisulfonamide, 12-oxo-12-(1-pyrenyl)dodecanoic acid, 4-(trifluoromethyl)umbelliferone, 6,7-dihydroxy-4-coumarinylacetic acid, 3,3'-dioctylthia carbocyanine iodide, 7-octadecyloxy-3-3-(3-sulfopropyl)-2-benzothiazolylio coumarin, 3-(2-benzothiazolyl)-7-octadecyloxy coumarin, 3-methyl-2-7-octadecyloxy-3-coumarinyl benzothiazolium methosulfate, 8-tetradecyloxypyrene-1,3,6-trisulfonic acid trisodium salt, dibromobimane, 8-acetoxy-N,N,N',N',N'', N''-hexamethylpyrene-1,3,6-trisulfonamide, n-(7-dimethylamino-4-methyl-3-coumarinyl)maleimide, 7-(diethylamino)coumarin-3,4-dicarboxylic acid, monobromobimane, N-(1-leucyl)-2-aminoacridone, N-(s-benzyl-1-cysteinyl)-2-aminoacridone, n-(n-succinyl-1-phenylalanyl)-2-aminoacridone, n-(n-glutaryl-1-phenylalanyl)-2-aminoacridone, n-(n-tosyl-1-phenylalanyl)-2-aminoacridone, benzofluoranthene, perylene, octadecyl 7-hydroxycoumarin-3-carboxylate, 8-hexadecyloxy pyrene-1,3,6-trisulfon acid trisodium salt, 8-dodecyl oxypyrene-1, 3,6-trisulfonic acid trisodium salt, 8-hydroxypyrene-1,3,6-trisulfonic acid trisodium salt, 7-acetoxy-1-methylquinolinium iodide, 8-octadecyloxy pyrene-1,3,6-trisulfonic acid trisodium salt, 8-decyloxy pyrene-1,3,6-trisulfonic acid trisodium salt, 8-methoxypyrene-1,3,6-trisulfonic acid trisodium salt, 1-(4-nitrophenyl)-6-phenylhexatriene, 6,8-dihydroxypyrene-1,3-disulfonic acid disodium salt, 7-hydroxy-1-methylquinolinium iodide, protoporphyrin, protoporphyrin-dimethyl ester, 7-(diethylamino)coumarin-3-carboxylic acid, N-succinimidyl 3-(2-benzothiazolyl)umbelliferone-4-carboxylate, 3-(5-chloro-2-benzoxazolyl)-4-cyanoumbelliferyl phosphate pyridine salt, thioflavine, 10-(3-sulfopropyl)acridinium betain, 10-(3-sulfopropyl)acridinium betain, 3-(5-chloro-2-benzoxazolyl)-4-cyanoumbelliferone, N-succinimidyl 7-hydroxycoumarin-3-carboxylate, 7-(diethylamino)coumarin-3-carbohydrazide, 8-(beta-d-galactopyranosyl oxy)-N,N,N',N',N'',N''-hexamethylpyrene-1,3,6-trisulfonamide, actinomycin, 2-(4-dimethylaminostyryl)-3-methylbenzoxazolium perchlorate, 8-aminopyrene-1,3,6-trisulfonic acid trisodium salt, 2-aminoacridone, phenazine, lucifer yellow dipotassium salt, lucifer yellow dilithium salt, lucifer yellow dilithium salt, N-succinimidyl 7-(diethylamino)coumarin-3-carboxylate, 7-(diethylamino)coumarin-3-carbonyl azide, 8-isothiocyanato pyrene-1,3,6-trisulfonic acid trisodium salt, 9-(2-carboxy-2-cyanvinyl)-julolidin-N-succinimidylester, 9-(2,2-dicyanvinyl)-julolidin, 9-(2-carboxy-2-cyanvinyl)-julolidin, 4-nitro-4'-(octadecylamino)stilbene, 4-(dioctadecylamino)-4'-nitrostilbene, proflavine hemisulfate dihydrate, 3-(2-benzothiazolyl)-7-(diethylamino)coumarin-4-carboxylic acid, benzo ninhydrin monohydrate, 8-hydroxypyrene-1,3,6-trisulfonic acid trisodium salt, N,N'-dimethyl-9,9'-biacridinium dinitrate, N,N'-dimethyl-9,9'-biacridinium dinitrate, tris(4,7-diphenyl phenanthrolin) ruthenium(ii)bis-complex, 3-(2-benzothiazolyl)-7-(diethylamino)coumarin, 2-(4-dimethylaminostyryl)-1-methylquinolinium iodide, 11-(7-nitrobenzofurazan-4-ylamino)undecanoic acid, 6-(7-nitrobenzofurazan-4-ylamino)hexanoic acid, 12-(7-nitrobenzofurazan-4-ylamino)dodecanoic acid, resorufin-beta-d-galactopyranoside, resorufin phosphate pyridine salt, resorufin-beta-d-glucopyranoside, 4-fluoro-7-nitrobenzofurazan, 1,3'-diethyl-4,2'-quinolyl thiacyanine iodide, doxorubicin hydrochloride, 4-(4-dipentadecyl aminostyryl)-1-methylpyridinium iodide, 2-(4-diethylamino styryl)-1-methylpyridinium iodide, dimidium bromide, ethidium bromide solution, ethidium bromide, ethidium bromide, ethidium bromide, fluorescein-5(6)-carboxamido caproic acid, 2',7'-bis(2-carboxyethyl)-5(6)-carboxyfluorescein, propidium iodide, 2-(4-dimethylaminostyryl)-1-methylpyridinium iodide, 3,3'-diheptyloxa carbocyanine iodide, 3,3'-diethyloxa carbocyanine iodide, 3,3'-dipropyloxa carbocyanine iodide, 3,3'-dipentyloxa carbocyanine iodide, 3,3'-dioctadecyloxa carbocyanine perchlorate, 3,3'-dihexyloxa carbocyanine iodide, 3,3'-dibutyloxa carbocyanine iodide, 4-(4-diethylaminostyryl)-1-methylpyridinium iodide, fluorescein isothiocyanate dextran, 5(6)-carboxyfluorescein, fluorescein sodium, fluorescein (free acid), fluorescein-5(6)-carboxamidocaproic acid n-succinimidyl ester, fluorescein isothiocyanate dextran, fluorescein isothiocyanate dextran, 5-carboxy-fluorescein n-succinimidylester, 5-carboxy-fluorescein, 6-carboxy-fluorescein, 6-carboxyfluorescein N-succinimidylester, fluorescein-5-thiosemicarbazide, 5-(iodoacetamido) fluorescein, ethidium homodimer, 10-dodecylacridine orange bromide, 10-octadecylacridine orange bromide, calcein disodium salt, 10-nonylacridine orange bromide, fluorescein mercuric acetate, rhodamine 110 chloride, N'-octadecyl fluorescein-5-thiourea, fluo 3,5(6)-carboxy-2',7'-dichloro fluorescein, 3-(2-benzoxazolyl)-4-cyanoumbelliferone, 9-(2-carboxyphenyl)-6-dimethylamino-3-xanthenone sulfate, rhodamine 116 perchlorate, eosin, rhodamine 5-3(4)-(aminocarbonyl)-4(3)-carboxybenzene sulfonyl fluoride, rhodamine B 5-3(4)-(aminocarbonyl)-4(3)-carboxybenzene sulfonyl fluoride, eosin yellowish, 5,10,15,20-tetrakis(1-methyl-4-pyridinio) porphyrin tetra(toluene-4-sulfonate), eosin 5-isothiocyanate, rhodamine 19 perchlorate, rhodamine 6 G, rhodamine 6 G tetrafluoroborate, rhodamine 800, 3,3'-diocta decylthiacarbocyanine perchlorate, resorufin butyrate, resorufin acetate, 5(6)-carboxytetra methylrhodamine N-succinimidyl ester, 5(6)-carboxytetra methylrhodamine N-succinimidyl ester, 5(6)-carboxytetra methylrhodamine, tetramethyl rhodamine β isothiocyanate, rhodamine β isothiocyanate, 6-carboxytetramethyl rhodamine N-succinimidylester, 5-carboxy-tetramethyl rhodamine N-succinimidylester, 6-carboxy-tetramethyl rhodamine, 5-carboxy-tetramethyl rhodamine, n-octadecanoyl-nile blue, streptavidin-B-phycoerythrin, biotin-B-phycoerythrin, 1,1'-dioctyl-3,3,3',3'-tetramethyl indocarbocyanine iodide, 3,3'-dihexylthia carbocyanine iodide, 1,1'-dihexyl-3,3,3',3'-tetramethylindocarbo cyanine iodide, bengal rose b, tetramethylrhodamine methyl ester perchlorate, 1,1'-dipropyl-3,3,3',3'-tetramethyl indocarbocyanine iodide, 1,1'-dipentyl-3,3,3',3'-tetramethyl indocarbocyanine iodide, 1,1'-dibutyl-3,3,3',3'-tetramethyl indocarbocyanine iodide, tetramethyl rhodamine ethyl ester perchlorate, 2-(4-dimethylaminostyryl)-1-octadecyl pyridinium perchlorate, 1,1'-dioctadecyl-3,3,3',3'-tetramethyl indocarbocyanine perchlorate, rhodamine B, rhodamine B octadecyl ester perchlorate, merocyanine 540, 3,3'-dipropyl thiacarbocyanine iodide, sulforhodamine b 5-acid fluoride, 3,3'-dipentyl thiacarbocyanine iodide, 1,1'-diethyl-3,3,3',3'-tetramethyl indocarbocyanine iodide, 3,3'-dibutylthia carbocyanine iodide, sulforhodamine B 2-acid fluoride, 3,3'-diheptylthia carbocyanine iodide, sulforhodamine B acid chloride, sulforhodamine B monosodium salt, rhodamine 101, 5(6)-carboxy-x-rhodamine, sulforhodamine Q 5-acid fluoride, 6-carboxy-X-rhodamin-N-succinimidylester, 5-carboxy-x-rhodamin-n-succinimidylester, 5-carboxy-X-rhodamine (5-ROX), 6-carboxy-X-rhodamine (6-Rox), 5(6)-carboxy-X-rhodamine N-succinimidyl ester, 3,3'-diethyloxa dicarbocyanine iodide, sulforhodamine Q 2-acid fluoride, sulforhodamine 101 acid chloride, sulforhodamine 101 free acid, naphthofluorescein, biotin-c-phycocyanin, cresyl violet perchlorate, 5(6)-carboxy naphthofluorescein N-succinimidyl ester, octaethylporphine, azure A, fluorescent red 646, fluorescent red 646, fluorescent red 646, 1,1'-dioctadecyl-3,3,3',3'-tetramethylindo dicarbocyanine perchlorate, meso-tetraphenylporphyrin, azure B, 3,3'-dipropyl thiadicarbocyanine iodide, 3,3'-diethyl thiadicarbocyanine iodide, 4,5-benzo-5'-(n-succinimidyl-oxycarbonyl-methyl)-1'-ethyl-3,3,3',3'-tetramethyl-1-(4-sulfobutyl) indodicarbocyanine, 4,5-benzo-5'-(iodoacetaminomethyl)-1',3,3,3',3'-pentamethyl-1-(4-sulfobutyl) indodicarbocyanine, 1,1'-bis(4-sulfobutyl)-11-(4-isothiocyanatophenylthio)-3,3,3',3'-tetramethyl-10,12-trimethyleneindo tricarbocyanine monosodium salt, 3,3'-diethyloxa tricarbocyanine iodide, 3,3'-diethylthia tricarbocyanine iodide, 2,5-bis(4-biphenylyl)-1,3,4-oxadiazole, 1-naphthylacetic anhydride, 5-dimethylamino naphthalene-1-sulfonamide, diphenylmaleic anhydride, carbazole-9-carbonyl chloride, n-(3-fluoranthyl)maleimide, n-4-(2-benzimidazolyl)phenyl maleimide, 6-hydroxy-2-naphthyl disulfide, 2-(2-amino-5-methylphenoxy)methyl-6-methoxy-8-aminoquinoline-N,N,N',N'-tetraacetic acid tetrapotassium salt, 1,2-phenylene diamine dihydrochloride, 1,2-phenylene diamine, 1,2-phenylene diamine, 2-(4-maleimidophenyl)-6-methylbenzothiazole, meso-1,2-bis(4-methoxyphenyl)ethylenediamine, N-(1-pyrenyl)maleimide, 1,2-diacetylbenzene, 4',6-diamidino-2-phenylindole dihydrochloride, 4-methylumbelliferyl-alpha-1-fucopyranoside, isonicotinic hydrazide, 4-hydroxybenz hydrazide, 9-chloromethyl-anthracene, 4-methylumbelliferyl-beta-d-lactoside, diphenylborinic anhydride, 4,5-methylenedioxy-1,2-phenylene diamine dihydrochloride, malonamide, Z-glycyl-1-proline-4-methyl-7-coumarinylamide, 1,3-cyclo hexanedione, 8-ethoxy-N,N,N',N',N'',N''-hexamethylpyrene-1,3,6-trisulfonamide, 4-(trifluoromethyl)umbelliferyl phosphate disodium salt, 4-(trifluoromethyl)umbelliferyl enanthate, 4-(trifluoromethyl)umbelliferyl oleate, 7-fluorobenzofurazane-4-sulfonic acid ammonium salt, 4-(trifluoromethyl)umbelliferyl butyrate, 2-methoxy-2,4-diphenyl-3(2h)-furanone, 4-(trifluoromethyl)umbelliferyl acetate, 8-methoxy-N,N,N',N',N'',N''-hexa methylpyrene-1, 3,6-trisulfonamide, 8-acetoxypyrene-1,3,6-trisulfonic acid trisodium salt, 4-hydrazino-7-nitrobenzofurazane, 5(6)-carboxy-2',7'-dichloro fluorescein diacetate, 4',5'-bis N,N-di (carboxymethyl)aminomethyl fluorescein, 2',7'-bis(2-carboxyethyl)-5(6)-carboxy fluorescein tetrakis (acetoxymethyl)ester, fluorescein dilaurate, fluorescein dibutyrate, fluorescein diacetate 5-isothiocyanate, 5(6)-carboxyeosin diacetate, 5-maleimido-eosin, naphthofluorescein diacetate, 5(6)-carboxynaphtho fluorescein diacetate N-succinimidyl ester, 4-dimethylamino-4'-nitrostilbene, 1,4-bis(2-methylstyryl)benzene, 1,4-bis(4-methyl-5-phenyl-2-oxazolyl)benzene, 2-(4-biphenylyl)-5-phenyl-1,3,4-oxadiazole, 2-(4-tert-butylphenyl)-5-(4-biphenylyl)-1,3,4- oxadiazole, 2-(p-tolyl)benzoxazole, 2-(4-biphenylyl)-6-phenylbenzoxazole, 4-hydroxycoumarin and 2,5-diphenyl-1,3,4-oxadiazole.

Fluorescent brighteners, also commonly known as optical brighteners, can be used as UV absorbers to extend the shelf life of the dosimeter. Optical brighteners, e.g., derivatives of stilbene and benzoxazol, are substances that are added to a textile or paper to increase the apparent light reflectance in the visible region by the conversion of ultraviolet radiation into visible light and so to increase the apparent brightness or whiteness. Fluorescent whiteners of color index (C.I.) C.I.24, C.I.31, C.I.33, C.I.71, C.I.85, C.I.113, C.I.140, C.I.184, C.I.199, C.I.199, C.I.199:1, C.I.199:1, C.I.199:1, C.I.220, C.I.220, C.I.351, C.I.367, C.I.378 can be used. Optical brighteners, such as amino-anilino-triazyl stilbene, 4-4'-diaminostilbene-2-2'-disulphonic acid, 4-4'-dinitrostilbene-2-2'-disulphonic acid, 2,2'-(2,5-thiophenediyl)bis[5-tert-butylbenzoxazole] and 2,5-thiophenediylbis(5-tert-butyl-1,3-benzoxazole) can be used to extend the shelf life of the dosimeter.

The diacetylenes in the dosimeter can also be protected from UV and sunlight by adding photochromic materials instead of, or along with, UV absorbers. Photochromic compounds change color when exposed to ultraviolet light. These compounds are colorless indoor and turn into a vibrant color outdoor. These compounds become intensely colored within seconds in direct sunshine and return to clear within minutes indoors. Photochromic compounds can be used in various forms, such as paints, inks, and plastics, such as polyvinyl chloride, polypropylene cellulose acetate butyrate, polyvinylacetate, urethanes, acrylics and are soluble in most organic solvents.

A list of particularly suitable shelf life extenders is included in Table 2.

TABLE 2

List of suitable shelf life extenders for diacetylenes 1,1,1-tris(4-hydroxyphenyl)ethane, 1,2,4-triazole, 1,3-cyclohexanedicarboxylic acid, 1,5 dihydroxy naphthalene, 10-nonadecanone, 1-amino-1-deoxy-d-sorbitol, 1-butylimidazole, 1-dodecyl-2-pyrrolidinone, 1-methyl-2-pyrrolidinone, 2-(2H-benzotriazol-2-yl)-6-dodecyl-4-methylphenol, 2,2'-biphenol, 2,2'-dihydroxy 4,4'dimethoxy benzophenone, 2,2'-dihydroxy 4-methoxybenzophenone, 2,2',4,4'-tetrahydroxybenzophenone, 2,2,6,6-tetramethyl 4-piperidinol, 2,3-dihydroxy naphthalene, 2,3,4-trihydroxybenzophenone, 2,3-dihydroxynaphthalene, 2,4-dihydroxybenzophenone, 2,4,6-trihydroxybenzaldehyde, 2,5-di-t-butyl hydroquinone, 2,7-dihydroxynaphthalene, 2-benzoyl benzoic acid, 2-butanone oxime, 2-hydroxy 4-methoxy benzophenone, 2-hydroxy-4-n-octoxybenzophenone, 3-hydroxy diphenyl amine, 3,3',4,4'-benzophenone tetracarboxylic dianhydride, 3,4-diaminobenzophenone, 3,5-dihydroxy benzoic acid, 3-acetamidophenol, 4-(benzeloxy) phenol, 4-(dimethylamino)-benzaldehyde, 4,4'-biphenol, 4,4'-(1,3-phenylene diisopropylidine)bis phenol, 4,4'-(1,4-phenylene diisopropylidine)bis phenol, 4,4'-isopropylidene, 4-acetamidophenol, 4-bromobenzaldehyde, 4-hydroxybenzophenone, 4-hydroxybenzophenone, 4-phenylphenol, 4-pyridinealdoxime, 4-tert-amylphenol, 7-hydroxy-4-methyl coumarin, acetamide, acetanilide, acetone oxime, adipamide, adipic acid, alpha-d-cellobiose octaacetate, aluminum acetylacetonate, aminocaproic acid, ammonium formate, ammonium thiocynate, amylphenol, ascorbic acid, ascorbic acid-6-palmitate, azodicarbonamide, 2,3-thiophenyl bis(5-t-butyl 1,3 benzoxazole), benzamide, benzilic acid, benzoic acid, benzoic acid, ammonium salt, benzophenone, benzophenone hydrazone, benzoquinone dioxime, benzotriazole, benzyl ether, beta-d-glucose pentaacetate, bis (3,4-epoxy cyclohexyl methyl) adipate, bis(2,2,6,6-tetramethyl-4-piperidyl) sebacate, bis(2-ethyl hexyl) maleate, bisphenol A, 2-(2H-benzotriazole-2y1)4-methyl phenol, 2-2'-hedroxy-5-octylphenyl benzotriazole, butanone oxime, camphor, citric acid, cyanuric acid, delta-gluconolactone, d-gluconic acid, diethanolamine, diethyl maleate, diphenylamine, d-isoascorbic acid, di-tert-butyl-4-methyl phenol, diethylamino methyl coumarin, methylesculin, ethyl acetoacetate, sodium salt, ethyl myristate, ethyl salicylate, ethylene carbonate, ethylene glycol diglycidyl ether, ethylenediaminetetraacetic acid, gamma-butyrolactone, TABLE 2-continued List of suitable shelf life extenders for diacetylenes glutanic acid, glycerol, glycoxal trimeric dihydrate, hydroquinone, hydroxybenzoic acid, imidazole, inositol, laural gallate, lauric acid, lauryl gallate, lecithin, methoxyhydroquinone, methyl 2,4-dihydroxybenzoate, methyl-3,4,5-trihydroxybenzoate, methyl-3,5-dinitrosalicylate, n-(4-hydroxyphenyl)-2-naphthylamine, n,n' diphenyl-1,4-phenylene diamine, n-4-hydroxyphenyl 2 naphthal amine, n-acytylglycine, n-phenyl-2-naphthylamine, octadeccanamide, oxamide, phenyl ether, phenyl hydroquinone, phthalide, poly(1,2 dihydro-2,2,4-trimethyl quinoline, poly(4-hydroxy-2,2,6,6-tetramethyl-4-piperidine ethanol-alt-1,4-butane-dioic acid), poly(ethyleneimine), propylene carbonate, pyrogallol, resorcinol, resorcinol diacetate, rutin hydrate, salicylaldehyde, salicylaldoxime, salicylanilinde, sorbitol hexaacetate, succidimide, tannic acid, t-butyl hyroquinone, tert-butyl acetoacetate, thiourea, trans-stilbene, tribenzylamine, triethanolamine, trimethylhydroquinone, triphenyl methanol, triphenyl phosphate, tris (2-chloroethyl) phosphite, tris (hydroxymethyl) aminomethane, uracil, dimethyl sulfoxide, sodium sulphite, hydroxyalkyl-hydroxylamine, morpholine, and urea.

We have found that by adding certain additives, such as oligomers, such as low molecular weight polyester, polyethylene glycol and polypropylene, amides, esters, urethanes, plasticizers and solvents, such as bis(ethyl hexyl) sebacate, by varying the hardness of the binder, by cocrystallization of diacetylenes, by using a proper mixture of diacetylenes and by using proper method of crystallization of diacetylenes, the effect of temperature of irradiation can be minimized and even can be eliminated.

Some of the dosimeters use liquids while others have maximum temperature of storage (Standards on Dosimetry for Radiation Processing, ASTM International, 100 Barr Harbor Drive, West Conshohochen, Pa., 2002). For example, GAF chromic film dosimeter (International Specialty Products, Wayne, N.J.) must be kept below 50-60° C. Hence, there is a need for a dosimeter which is not affected by ambient maximum and minimum temperatures. Some types of personal dosimeters may be laundered where the temperature in the washer and/or drier may reach as high as 90-100° C. Hence, there is a need for a dosimeter which is not affected by ambient storage or accidental heating to anticipated higher temperatures. We have found that the dosimeter can be made laundry resistant by selecting radiation sensitive materials, such as diacetylenes having melting point higher than 100° C.

As a personal dosimeter, the dosimeter must not be affected by ambient light for days to months and under direct sunlight for at least for sometime, such as hours to days and still remain readable under any light. Most of the dosimeters are affected by direct sunlight. They are either protected with opaque material or develop color/dose if exposed to sunlight. Hence, there is need for a dosimeter which is not affected by ambient light for days to months or by direct sunlight from hours to days so it can be easily read. We have found that the effect of UV and sunlight can be minimized by adding UV absorbers, using UV absorbing polymers for the active layer and by applying a coat or layer which absorbs or reflect UV light.

The dosimeter also must not be affected by ambient humidity and accidental high humidity, such as in a normal laundry. Some of the film dosimeter use gelatin as a binder or the radiation sensitive materials are affected by humidity and water. Hence, there is a need for a dosimeter which is not affected by normal ambient humidity for months and accidental exposure of very high humidity at high temperatures for a short time. Effect of humidity can be minimized by using water insoluble binders and polymeric binders which are less permeable to moisture.

Some of the dosimeters, such as Gafchromic film of ISP, Wayne, N.J., don't develop full color instantly. They show some post radiation effect and it takes about a day to develop the rest of the 10-20% of the color. It is desirable to have a dosimeter which develops full color almost instantly. We have found that the dosimeters described here develop full color almost instantly, i.e., in less than a second to minutes.

In order to facilitate processing of the molten polymers, such as PVC viscosity reducers, such as white spirit, poly (ethylene glycol) monolaurate, alkylphenols, low molecular weight paraffins are added. The heat stabilizers and viscosity reducers have effect on crystallization and properties of diacetylene.

Diacetylenes are known to polymerize only in the solid state. Diacetylenes sometimes crystallize into inactive form or form a solid solution with certain binders. Proper conditions for crystallization of diacetylene must be used for crystallization so that they crystallize into radiation active phases, i.e., phases which polymerize upon irradiation. Proper crystallization of diacetylenes can be achieved by using proper solvents, heat stabilizers, additives, binder and by using proper methods of crystallization and annealing. For example, a diacetylene can be crystallized into an active phase from one solvent while into an inactive form from the other. Similarly, a diacetylene can be made active and crystallize into active phase by annealing from low a low temperature to a higher temperature for a sufficiently long time or vice versa.

Crystallization of diacetylenes can be increased by adding nucleating agents which are usually finely dispersed particles. The same nucleating agents can help in preventing crystallization of polymeric binder because of their high molecular weight.

Diacetylenes develop a variety of colors, such as blue, purple, violet, red, orange and yellow colors upon polymerization. Proper colored element/dosimeter can be achieved by mixing two or more diacetylenes or by cocrystallization of two or more diacetylenes.

Some diacetylenes display positive while others display negative coefficient of temperature of radiation. The effect of temperature of irradiation can be minimized or eliminated by selecting two or more diacetylenes having proper negative and positive coefficient of temperature of radiation. For example, the effect of temperature of radiation can be minimized by mixing two blue diacetylenes, one having positive coefficient of temperature of radiation while the other having negative coefficient of temperature of radiation.

The radiation sensitive element remains active and can keep on accumulating dose unless fixed. In order to archive the exposure/results, the dosimeter needs to be fixed. The dosimeter can be fixed, e.g., by heating the element/dosimeter till diacetylene becomes inactive, crystallizes in to an inactive phase or forms a solid solution with binder or dissolution with other additives and does not re-crystallize in active form. For example, diacetylene 166 can be fixed by heating above about 90° C. and many diacetylenes can be fixed by forming a solid solution with proper binder, e.g., 4BCMU and 344 with polyvinylacetate and polymethylmethacrylate. Many additives, such as trihydroxybenzoic acid which react and/or dissolve the diacetylene can also be used to fix the dosimeter.

Certain compounds, or oligomers, such as low molecular weight polyester, polyethylene glycol and polypropylene, amides, esters, urethanes, plasticizers and solvents, such as bis(ethyl hexyl) sebacate when added with diacetylenes, such as 344 and 4BCMU, minimize the coefficient of temperature of radiation.

The effect of temperature of radiation can be minimized by using proper processes for crystallization of diacetylenes from solvent and binder. Processes to be used depend on the nature and concentration of diacetylene, solvent/plasticizer, additives and binder.

Diacetylenes are colorless compounds. Hence, the starting color of the dosimeter can be changed by adding proper dyes or pigments. For example, for a blue diacetylene, addition of a yellow dye provides yellow→yellow green→green→green blue→blue color changes as the diacetylene polymerizes upon irradiation. Similarly, for a red diacetylene, addition of a blue dye will provide blue→purple/violet→red color changes as the diacetylene polymerizes upon irradiation.

The diacetylene used in the element/dosimeter usually would have a coating or a layer of plastic film. These coating and films usually reflect light and hence it becomes difficult to observe the color and to read the color density with a spectrophotometer or an optical densitometer. The reflectance of light can be minimized by using antireflective, antiglare coatings or polarizing films available commercially.

The adhesion of different layers of the elements and the dosimeters can be increased by using proper adhesives or using adhesion promotors in a layer of the element/dosimeter. Adhesives could be pressure sensitive or hot melt type.

The dosimeter badge can be assembled in a variety of ways. Processes to be used to make them will depend upon the design of the badge, the nature of the element and other components and the intended use.

When a person receives about 1,000 rads of high energy radiation, such as gamma ray, the mortality is almost assured. As a personal dosimeter, it should be able to read dose over very wide dose range, e.g., 0-10, 0-50, 0-100, 0-200, 0-500 and 0-1,000 rads just by comparing the color developed by the radiation sensitive element with a color reference chart with reasonable accuracy, such as 10-20% of the total dose. The color reference chart can be created by matching the color of the radiation sensitive element irradiated at different dosages with the color reference chart. The color reference chart should have a gradation of colors matching to the color developed by the radiation sensitive element over the dose range. The color on the reference chart could be continuous from very light (colorless) to very dark or in steps. The dose, the action to be taken and/or effect of radiation at that dose can be printed on the color reference chart. As a personal dosimeter, it should warn or alert the person using it from the color developed by the element. The color of the reference chart must match the color of the element under all normal light conditions, such as incandescent, fluorescence, sunlight and shade. This can be achieved by mixing proper dyes and pigments for the color reference chart till they match the spectra of the diacetylenes used. Messages, such as what that dose can do and what action should be taken can be included as can basic information, such as introduction, how to use and read the dosimeter, effect of radiation and action to be taken in case of radiation exposure, suppliers, batch number, logo of the user group, whom to contact in case of emergency or dispute, name of the user or space to write such name, etc.

If required, the dose can be accurately monitored with a spectrophotometer or an optical densitometer. A calibration curve can be created by irradiating the element with different dosages of high energy radiation and plotting optical density versus dose. An instrument can be designed to read the bar code and other information along with the dose.

The dosimeter can have many security features and convenient features, such as bar codes to identify the dosimeter and magnetic strip to store and read info on the dosimeter. The dosimeter could have many other security features, such as hologram and UV fluorescence coatings.

It is very difficult to create a color reference chart from commercially available inks that match the color of the irradiated element under any and all light conditions. However, it possible to create a color reference chart using the same diacetylene polymerized into the desired colors to create a color reference chart, either with X-ray or UV light. The color reference chart created by this method would match the color of the element under any and all light conditions.

The preferred dosimeter should specific criteria. The materials should be nontoxic and reasonably priced. The substrate of the badge should preferably be opaque and not brittle or too flexible. The top layer should be transparent, of 5-200 microns thickness so the element can be read and protected from sunlight. The thickness of dosimeter/badge, preferably, should be between about 25-2,500 microns. The size of the dosimeter could be from a few millimeter long strip to any large size. Preferred size is that of the credit card. The card should be very light so it can be carried in a pocket. The shelf life should be from a week to several years, preferably one to two years. It should be unaffected by ambient conditions, such as light, humidity and temperature. It should develop reasonable color so the dose interest can be estimated from the color reference chart or electronic equipment, such as spectrophotometer or an optical densitometer. It should monitor all kinds of radiation, such as X-ray and neutrons, higher energy electron, protons etc.

The radiation sensitive devices described here offer many major advantages over other similar devices. They will be the simplest devices; just a piece of plastic. They will be inexpensive. Radiation sources can be imaged in three dimensions. They will be tissue equivalent and hence no corrections will be required. They will be a self-developing and instant device. The images can be fixed for archiving the results. They can be used as a personal and area dosimeter. They will be highly sensitive. They will be able to monitor very low dose ~1 mGy. Dose can be determined with an accuracy of better than 5% with a spectrophotometer/colorimeter. They can be used over a wide dose range (1 mGy to 100,000 Gy). The color development of the device will be essentially independent of the energy and the dose rate. They will monitor all kinds of high-energy radiations, such as UV, X-ray, gamma ray, protons, electrons, alpha particles and neutrons. They use no toxic chemicals. They will be unaffected by ambient conditions, e.g., temperature and humidity.

EXAMPLES

The following Examples are illustrative of carrying out the claimed invention but should not be construed as being limitations on the scope and spirit of this invention.

Example 1

Making of SIRAD Sensing Strip

A sensing strip would be prepared in accordance with the following. In a 5,000 ml round bottom flask equipped with a stirrer and an addition funnel would be added 400 gram (2.4 mole) of 4,6-decadiyn-1,10-diol and 1300 ml of anhydrous THF. The mixture would be stirred to dissolve the diol. To the solution would be added 1 gram of dibutyltin bis(2-ethyl hexanoate) and 10 ml of triethylamine as the catalysts. To the mixture would be added 500 gram (5.05 mole) of n-butyl isocyanate over 45 minutes. Temperature of the reaction would be maintained at ~15° C. with ice-cold water. The mixture would be stirred for one additional hour and then the temperature would be raised to 50° C. The reaction would be allowed to proceed for about half an hour and then 40 ml of methanol would be added to destroy the excess unreacted isocyanate. The content would then cooled to −20° C. in a freezer. The diacetylene-344 would be filtered cold and recrystallized first from ethylacetate followed by recrystallization from isopropanol. The yield after recrystallization would be expected to be about ~810 gram (93%). The crystals would be dried under vacuum, m.p. 112° C. A stock solution would be prepared as follows. In a five liter stainless beaker would be added 1350 g of the above stock solution of PVA and 335 g of diacetylene-344 under stirring. The mixture would be heated to ~80° C. The solution would be slowly poured into about 3 gallons of liquid nitrogen while stirring with a mechanical stirrer. The mechanical stirrer would make the solidified emulsion in to a powder. The solid emulsion would be spread in to four aluminum (60×30×3 $cm^3$) trays and allowed to warm up at room temperature overnight. The trays would be covered with a plastic film with holes. The emulsion would then be transferred in to a wide mouth plastic jar and diluted with 3:1 ethanol:water to obtained ~900 cP viscosity. The dosimeter-film would be coated. Coating parameters, such as viscosity of the solutions, size of the coating bar, coating/film speed, coating thickness and drying rate/temperature would be varied to obtain transparent uniform coating as known in the art. The film would then be coated on the back side under the determined conditions. The PVA/diacetylene-344 coats would then be top coated with polyvinylacetate in ethanol:water (7:3) solutions using #60 cylinder, first on one side and then on the other. These and other parameters would be varied until a uniformly coated dry film was obtained. Representative coating parameters are provided in the table.

| Representative Coating Parameters | |
|---|---|
| Web/film | 12" wide, 100 micron thick clear subbed Cronar ® film |
| Emulsion | 1:1 Mixture of PVA:diacetylene-344 in 3:1 ethanol:water. |
| Viscosity of the emulsion | ~900 cP. |
| Coating technique | Reverse roll gravure. |
| Coating rods | #30 (30 cells/inch) helical gravure. |
| Coating rod speed | 36 rpm. |
| Web speed | 1.3 meter/minute. |
| Drying path | Total 24 feet, 7 feet before oven, 17 feet in oven. |
| Drying temperatures | Three zones, (First: 40° C.; Second: 45° C., and Third: 50° C.). |
| Wet thickness of the coating | 35-40 microns. |
| Dried thickness of the diacetylene-344/PVA coat | 15 microns. |
| Top/barrier coat | PVA in 7:3 ethanol:water. |
| Thickness of top coat: | ~1-2 microns. |

Figure 5:
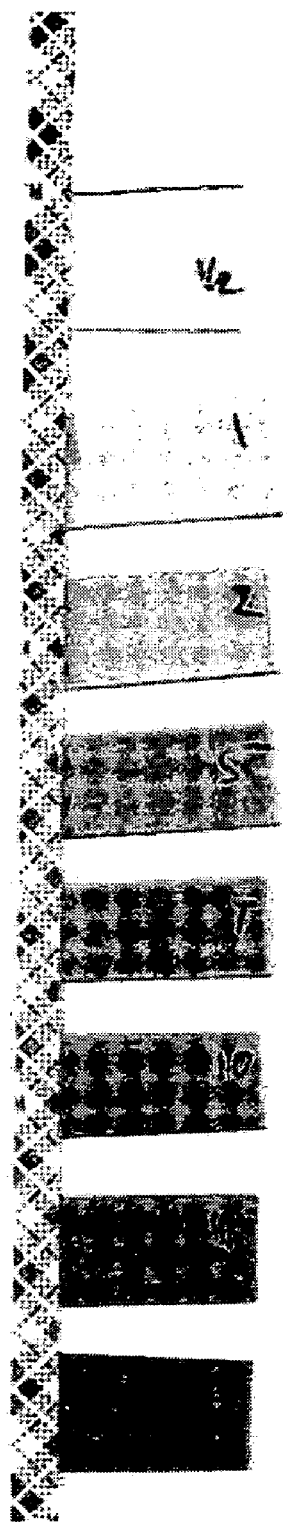
FIG. 5 represents a photograph of pieces of sensing strip of an embodiment irradiated at different dosages of 100 KeV X-ray.
Figure 6:
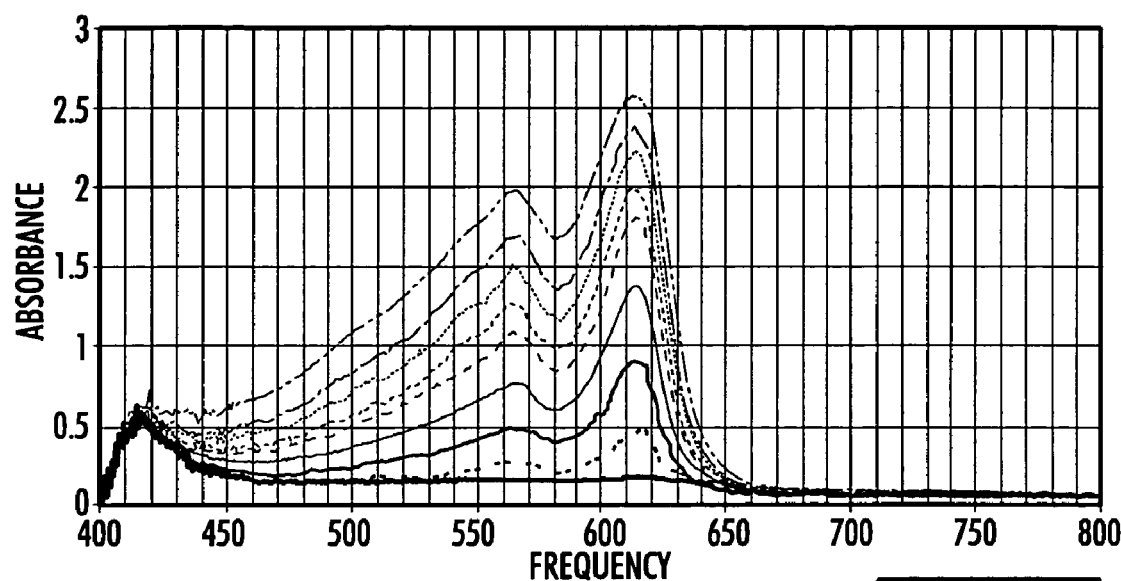
FIG. 6 is a typical set of visible spectra of the sensing strip the embodiment of FIG. 5 irradiated with different dosages of 100 KeV X-ray.
Figure 6:
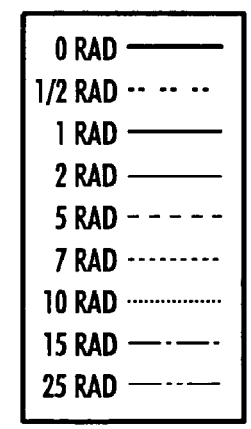

The corresponding visible spectra of the irradiated sensing strip would be expected to be as shown in FIG. 6. The representative exposure results would be expected to appear as in FIGS. 5 and 6, wherein a dose as low as 0.5 would be expected to be clearly visible. It would be expected that an even lower dose (e.g., 0.1 rad) could be monitored using a spectrophotometer with a thicker sensing strip expected to monitor an even lower dose. For example, 10 times thicker sensing strip would be expected to monitor 0.01 rad.

Example 2

Making of SIRAD Tape

A pressure sensitive adhesive (Avery Dennison, PSA # E5700 acrylic emulsion) would be applied and dried on the back of the SIRAD sensing strip of Example 1. A release paper would be applied onto the adhesive.

Example 3

Application of SIRAD on a Radiation Counter

The sensing strip of Example 2 would be applied on a radiation counter (Digilert, S. E. International, Inc., Summertown, Tenn.). The assembly would be irradiated with 0.5 rad of 100 KeV X-ray. The counter would be expected to be overwhelmed with the dose but the SIRAD strip would be expected to develop to a faint but distinctly noticeable blue color instantly at the equivalent of 0.5 rad. In case a user of the radiation detector is accidentally exposed to high dose of radiation, SIRAD would monitor the dose.

Example 4

Application of SIRAD on a Quartz Fiber Dosimeter

A piece of SIRAD sensing strip of Example 2 would be applied on a quartz fiber dosimeter (Gamma meter, Victoreen Instruments Company, Cleveland, Ohio). The assembly would be irradiated with 100 rads of 100 KeV X-ray. The quartz fiber dosimeter would display the dose of 100 rads and the color developed by the sensing strip would be equivalent to 100 rads.

Example 5

Application of SIRAD on a Radiation Dosimeter

A piece of SIRAD sensing strip from example 2 would be applied on a holder on a TLD dosimeter. The assembly would be irradiated with 100 rads of 100 KeV X-ray. The SIRAD strip would develop a color equivalent to 100 rads.

Example 6

Another Form of Stick-On SIRAD

A 0.5×1 cm piece of sensing strip of Example 1 would be cut and applied on an opaque substrate having a color reference chart. A pressure sensitive adhesive (Avery Dennison, PSA # E5700 acrylic emulsion) would be applied to one end of assembly to make SIRAD similar to that shown in FIG. 7. A release paper would be applied onto the adhesive.

Example 7

Applying Stick-On SIRAD onto Objects

The Stick-on SIRADs of Example 6 would be applied on dosimeters, detectors and other objects with the adhesive and sensing-strip facing the objects for example as shown schematically in FIG. 8. This assembly would protects the sensing strip from UV/sunlight and the exposure could be read by lifting the open end.

The invention has been described with particular emphasis on the preferred embodiments without limit thereto. Alternative embodiments cold be realized without departing from the scope of the invention which is more specifically set forth in the claims appended hereto.

The invention claimed is:

1. A radiation monitoring device comprising:
a support;
a self-developing, self-indicating, instant radiation sensitive material coated on said support wherein a radiation dose of 0.01 to 1,000 rads of ionizing radiation can be monitored visually; and
a bonding layer on said support.

2. The radiation monitoring device of claim 1 wherein said bonding layer is an adhesive.

3. The radiation monitoring device of claim 2 wherein said adhesive is a pressure sensitive adhesive.

4. The radiation monitoring device of claim 1 further comprising a second radiation monitor selected from TLD, X-ray film, Geiger-Muller counter, proportional counter, scintillation counter, ionic chamber, and electronic dosimeter wherein said bonding is between said support and said second radiation monitor.

5. The radiation monitoring device of claim 1 further comprising a density reference chart correlating ionizing radiation dose to density of said material.

6. The radiation monitoring device of claim 1 wherein said radiation sensitive material comprises at least one diacetylene containing material.

7. The radiation monitoring device of claim 6 wherein said diacetylene containing material comprises:

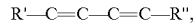

wherein R' and R'' are the same or different substituent groups.

8. The radiation monitoring device of claim 7 wherein R' and R'' are independently selected from $(CH_2)_b$—H; $(CH_2)_b$ OH; $(CH_2)_b$—OCONH—R1; $(CH_2)_b$—O—CO—R1; $(CH_2)_b$—O—R1; $(CH_2)_b$—COOH; $(CH_2)_b$—COOM; $(CH_2)_b$—NH_2; $(CH_2)_b$—CONHR1; $(CH_2)_b$—CO—O—R1; where b=1-10; R1 is an aliphatic or aromatic radical, and M is a cation.

9. The radiation monitoring device of claim 7 wherein said R' and R'' are independently selected from —OCONH $(CH_2)_5CH_3$; —OCONH$(CH_2)_4CH_3$; —OCONH$(CH_2)_3$ $CH_3$; —OCONH$(CH_2)_2$ $CH_3$; —OCONHCH$_2$CH$_3$; and —OCONHCH$_3$.

10. The radiation monitoring device of claim 6 wherein said diacetylene containing material is selected from 2,4-hexadiyne, 2,4-hexadiyn-1,6-diol, 3,5-octadiyn-1,8-diol, 4,6-decadiyn-1,10-diol, 5,7-dodecadiyn-1,12-diol and diacetylenic fatty acids, pentacosa-10,12-diynoic acid.

11. The radiation monitoring device of claim 6 wherein said diacetylene containing material is selected from urethane derivatives comprising alkyl, aryl, benzyl, methoxy phenyl, alkyl acetoacetate, fluoro phenyl, alkyl phenyl, halo-phenyl, cyclohexyl, toyl and ethoxy phenyl of 2,4-hexadiyn-1,6-diol, 3,5-octadiyn-1,8-diol, 4,6-decadiyn-1, 10-diol, and 5,7-dodecadiyn-1,12-diol.

12. The radiation monitoring device of claim 6 wherein said diacetylene containing material is selected from derivatives of 2,4-hexadiyn-1,6-diol; R'CH$_2$—C≡C—C≡C— CH$_2$R', wherein R' is selected from —OCONH$(CH_2)_5CH_3$, —OCONH(CH$_2$)$_4$CH$_3$, —OCONH(CH$_2$)$_3$CH$_3$, —OCONHCH$_2$CH$_3$, —OCONHCH$_3$; R'''CH$_2$—C≡C—C≡C—CH$_2$R''', wherein R''' is selected from —OCO(CH$_2$)$_3$CH$_3$, —OCOCH$_2$CH$_3$, —OCOCH$_3$; and cocrystallized mixtures thereof.

13. The radiation monitoring device of claim 6 wherein said diacetylene containing material is a derivative of one material selected from 3,5-octadiyn-1,8-urethane; 4,6-decadiyn-1,10-urethane and 5,7-dodecadiyn-1,12-urethane.

14. The radiation monitoring device of claim 6 wherein said diacetylene containing material is selected from methyl, ethyl, propyl and butyl urethane derivatives of 4,6-decadiyn-1,10-diol.

15. A radiation monitor comprising a support sheet and a cover sheet with a self-developing, self-indicating, instant radiation sensitive material there between wherein said material changes optical density in relation to received dose;
 a dose monitor integral to said detector wherein said dose monitor has densities corresponding to said optical density of said material; and
 a bonding layer on an exterior of said monitor
 further comprising printed information wherein said printed information indicates dosage.

16. The radiation monitor of claim 15 wherein said bonding layer is an adhesive.

17. The radiation monitor of claim 16 wherein said adhesive is a pressure sensitive adhesive.

18. The radiation monitor of claim 15 further comprising a second radiation monitor selected from TLD, X-ray film, Geiger-Muller counter, proportional counter, scintillation counter, ionic chamber, and electronic dosimeter wherein said bonding layer is between said support and said second radiation monitor.

19. The radiation monitor of claim 15 further comprising a release layer.

20. The radiation monitor of claim 15 further comprising a density reference chart correlating ionizing radiation dose to density of said material.

21. The radiation monitor of claim 15 wherein said radiation sensitive material comprises at least one diacetylene containing material.

22. The radiation monitor of claim 21 wherein said diacetylene containing material comprises:

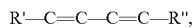

R'—C≡C—C≡C—R'', wherein R' and R'' are the same or different substituent groups.

23. The radiation monitor of claim 22 wherein R' and R'' are independently selected from (CH$_2$)$_b$—H; (CH$_2$)$_b$OH; (CH$_2$)$_b$—OCONH—R1; (CH$_2$)$_b$—O—CO—R1; (CH$_2$)$_b$—O—R1; (CH$_2$)$_b$—COOH; (CH$_2$)$_b$—COOM; (CH$_2$)$_b$—NH$_2$; (CH$_2$)$_b$—CONHR1; (CH$_2$)$_b$—CO—O—R1; where b=1-10; R1 is an aliphatic or aromatic radical, and M is a cation.

24. The radiation monitor of claim 22 wherein said R' and R'' are independently selected from —OCONH(CH$_2$)$_5$CH$_3$; —OCONH(CH$_2$)$_4$CH$_3$; —OCONH(CH$_2$)$_3$CH$_3$; —OCONH(CH$_2$)$_2$CH$_3$; —OCONHCH$_2$CH$_3$; and —OCONHCH$_3$.

25. The radiation monitor of claim 21 wherein said diacetylene containing material is selected from 2,4-hexadiyne, 2,4-hexadiyn-1,6-diol, 3,5-octadiyn-1,8-diol, 4,6-decadiyn-1,10-diol, 5,7-dodecadiyn-1,12-diol and diacetylenic fatty acids, pentacosa-10,12-diynoic acid.

26. The radiation monitor of claim 21 wherein said diacetylene containing material is selected from urethane derivatives comprising alkyl, aryl, benzyl, methoxy phenyl, alkyl acetoacetate, fluoro phenyl, alkyl phenyl, halo-phenyl, cyclohexyl, toyl and ethoxy phenyl of 2,4-hexadiyn-1,6-diol, 3,5-octadiyn-1,8-diol, 4,6-decadiyn-1,10-diol, and 5,7-dodecadiyn-1,12-diol.

27. The radiation monitor of claim 21 wherein said diacetylene containing material is selected from derivatives of 2,4-hexadiyn-1,6-diol; R'CH$_2$—C≡C—C≡C—CH$_2$R', wherein R' is selected from —OCONH(CH$_2$)$_5$CH$_3$, —OCONH(CH$_2$)$_4$CH$_3$, —OCONH(CH$_2$)$_3$CH$_3$, —OCONHCH$_2$CH$_3$, —OCONHCH$_3$; R'''CH$_2$—C≡C—C≡C—CH$_2$R''', wherein R''' is selected from —OCO(CH$_2$)$_3$CH$_3$, —OCOCH$_2$CH$_3$, —OCOCH$_3$; and cocrystallized mixtures thereof.

28. The radiation monitor of claim 21 wherein said diacetylene containing material is a derivative of one of 3,5-octadiyn-1,8-urethane; 4,6-decadiyn-1,10-urethane and 5,7-dodecadiyn-1,12-urethane.

29. The radiation monitor of claim 21 wherein said diacetylene containing material is selected from methyl, ethyl, propyl and butyl urethane derivatives of 4,6-decadiyn-1,10-diol.

30. The radiation monitor of claim 15 wherein said dose indicator is between said support sheet and said cover sheet.

31. The radiation monitor of claim 15 wherein said material changes color in relation to received dose.

32. The radiation monitor of claim 15 wherein said material changes optical density at a radiation dose of 0.1 to 1,000 rads.

33. The radiation monitor of claim 15 further comprising a shelf life extender.

34. The radiation monitor of claim 15 further comprising at least one stabilizer selected from the group consisting of heat stabilizer, reactive species quencher, radical scavenger, oxygen scavenger, antioxidant, reactive species inhibitor, reactive species preventor, thermo-oxidative preventor, photo-oxidative preventor, hydroperoxide decomposer, hydrogen donor, metal destabilizer, UB stabilizer, UB absorber, UV reflector, fluorescent and optical brightener.

35. The radiation monitor of claim 15 further comprising a plasticizer.

* * * * *